(12) United States Patent
Schoolcraft, Jr. et al.

(10) Patent No.: US 12,134,296 B2
(45) Date of Patent: Nov. 5, 2024

(54) ADJUSTABLE SUSPENSION COMPONENTS FOR BICYCLES

(71) Applicant: SRAM, LLC, Chicago, IL (US)

(72) Inventors: R. Joe Schoolcraft, Jr., Colorado Springs, CO (US); Geoff Nichols, San Luis Obispo, CA (US); Warren Chambliss, Colorado Springs, CO (US); Mark Santurbane, Colorado Springs, CO (US); C. Michael Liberato, II, Mason, MI (US)

(73) Assignee: SRAM, LLC, Chicago, IL (US)

( * ) Notice: Subject to any disclaimer, the term of this patent is extended or adjusted under 35 U.S.C. 154(b) by 631 days.

(21) Appl. No.: 16/858,161

(22) Filed: Apr. 24, 2020

(65) Prior Publication Data

US 2021/0331550 A1 Oct. 28, 2021

(51) Int. Cl.
| | |
|---|---|
| *B60G 17/06* | (2006.01) |
| *B60G 17/015* | (2006.01) |
| *B60W 10/22* | (2006.01) |
| *B60W 30/182* | (2020.01) |
| *B60W 40/09* | (2012.01) |
| *B60W 40/10* | (2012.01) |
| *B62K 25/04* | (2006.01) |

(52) U.S. Cl.
CPC .......... *B60G 17/06* (2013.01); *B60G 17/015* (2013.01); *B60W 10/22* (2013.01); *B60W 30/182* (2013.01); *B60W 40/09* (2013.01); *B60W 40/10* (2013.01); *B62K 25/04* (2013.01); *B60G 2300/12* (2013.01); *B62K 2201/08* (2013.01)

(58) Field of Classification Search
CPC .. B60G 17/06; B60G 17/015; B60G 2300/12; B60W 10/22; B60W 30/182; B60W 40/09; B60W 40/10; B62K 25/04; B62K 2201/08; B62K 2025/044; B62J 45/00; B62J 45/40
USPC .......................................................... 701/37
See application file for complete search history.

(56) References Cited

U.S. PATENT DOCUMENTS

| | | | |
|---|---|---|---|
| 2004/0153227 A1 | 8/2004 | Hagiwara | |
| 2011/0202236 A1* | 8/2011 | Galasso | ................. B62K 25/04 701/37 |
| 2016/0339989 A1* | 11/2016 | Walthert | ................... F16F 9/06 |

FOREIGN PATENT DOCUMENTS

| | | | | |
|---|---|---|---|---|
| CN | 107097892 A | * | 8/2017 | |
| EP | 2271544 B1 | | 7/2012 | |
| EP | 2871082 A2 | * | 5/2015 | ........... B60G 17/016 |

\* cited by examiner

*Primary Examiner* — Maceeh Anwari

(57) ABSTRACT

Example adjustable suspension components for bicycles are described herein. An example bicycle suspension component includes a damper operable in a low damping state, a high damping state, and an intermediate damping state between the low damping state and the high damping state, a motion controller operable to change the damper between the low damping state, the intermediate damping state, and the high damping state, and a processor to, based on sensor data, activate the motion controller to change the damper between the intermediate damping state and one of the low damping state or the high damping state.

16 Claims, 14 Drawing Sheets

ADJUSTABLE SUSPENSION COMPONENTS FOR BICYCLES

FIELD OF THE DISCLOSURE

This disclosure relates generally to bicycle components and, more specifically, to adjustable suspension components for bicycles.

BACKGROUND

Bicycles are known to have suspension components. Suspension components are used for various applications, such as cushioning impacts, vibrations, or other disturbances experienced by the bicycle during use. A common application for suspension components is for cushioning impacts or vibrations experienced by the rider when the bicycle is ridden over bumps, ruts, rocks, pot holes, and/or other obstacles. These suspension components often include rear and/or front wheel suspension components.

SUMMARY

Disclosed herein is a suspension component for a bicycle. The suspension component includes a damper operable in a low damping state, a high damping state, and an intermediate damping state between the low damping state and the high damping state, a motion controller operable to change the damper between the low damping state, the intermediate damping state, and the high damping state, and a processor to, based on sensor data, activate the motion controller to change the damper between the intermediate damping state and one of the low damping state or the high damping state.

Disclosed herein is a suspension component for a bicycle. The suspension component includes a damper, a motion controller operable to change the damper between a first damping state and a second damping state, and a processor to activate the motion controller to change the damper between the first damping state and the second damping state based on sensor data from a first time period and a second time period, the second time period being longer than the first time period.

Disclosed herein is a suspension component for a bicycle. The suspension component includes a damper, a motion controller to change the damper between a first damping state and a second damping state, a wireless transceiver to receive sensor data from a sensor, and a processor to activate the motion controller to change the damper between the first damping state and the second damping state based on the sensor data Disclosed herein is a non-transitory machine-readable medium including instructions that, when executed, cause at least one processor to at least determine a pitch angle of a bicycle and change a damping level of a damper of a suspension component of the bicycle based on the pitch angle.

Disclosed herein is a non-transitory machine-readable medium including instructions that, when executed, cause at least one processor to at least determine a rider is pedaling a bicycle and change a damping level of a damper of a suspension component of the bicycle based on the determination the rider is pedaling the bicycle.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
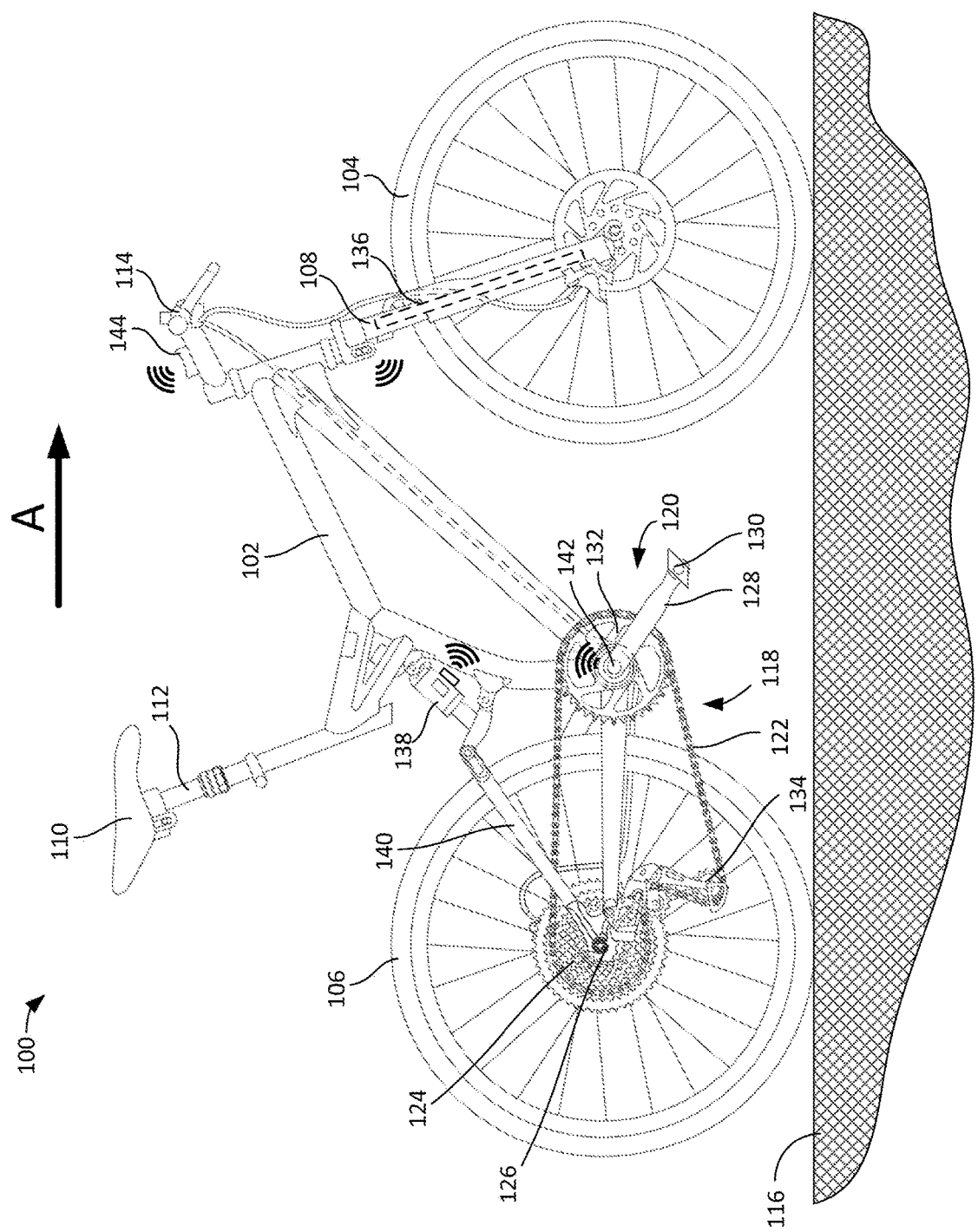
FIG. 1 is a side view of an example bicycle on which example components disclosed herein can be implemented.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example adjustable suspension components for bicycles and examples methods and processes implemented by such suspension components. The example suspension components disclosed herein are capable of automatically adjusting a damping level or state of the suspension component without user input. This optimizes performance of the bicycle for the rider and frees the rider from having to manually select a suspension state for the suspension component. For example, the suspension component can automatically change suspension states based on changes in the bicycle state and/or riding environment while the bicycle is being ridden.

A suspension component, such as a shock absorber, includes a spring and a damper. In some examples, the damping level of the damper can be increased or decreased, thereby affecting the response of the suspension component to shocks and impacts. In some examples, the damper can be adjusted to two or more defined damping levels, referred to as damping states or suspension states. Different damping states are preferable for different environments and/or riding conditions. For example, when riding a bicycle over a rough terrain, it is typically preferred to have the damper in a lower damping state to enable the suspension component to absorb the shocks and impacts. However, when pedaling the bicycle on relatively flat and/or smooth ground, it is typically preferred to have the damper in a high damping state, which minimizes the loss of power when pedaling the bicycle.

The example suspension components disclosed herein can detect various parameters of the bicycle state and/or riding environment and automatically adjust the damping state for optimal performance. In some examples, the suspension component detects the parameters based on sensor data from one or more sensors on the bicycle. Some example suspension components disclosed herein include a processor that analyzes the sensor data and determines whether to keep the suspension component in the same state or switch to a different damping state. In some examples, the sensor data is from a sensor (e.g., an accelerometer) that detects pedaling of the bicycle. Additionally or alternatively, the sensor data may be from a sensor (e.g., an accelerometer) that detects vibration input to the bicycle, such as caused by a bumpy terrain.

In some examples disclosed herein, the damper is operable between three damping states, such as a low damping state, a high damping state, and an intermediate damping state between the low damping state and the high damping state. The suspension component can include a motion controller operable to change the damping state of the damper. The processor analyzes the sensor data and, based on the sensor data, can activate the motion controller to change the damper between the low damping state, the intermediate damping state, and the high damping state. In some examples, the processor analyzes data from multiple sensors. For example, the processor may analyze vibration data from a vibration sensor (e.g., an accelerometer) on the suspension component, which is indicative of vibration input to the bicycle, and/or pedal data from a pedal detection sensor (e.g., an accelerometer), which is indicative of pedaling.

In some examples, the suspension component receives the sensor data wirelessly from one or more sensors on the bicycle. For example, the suspension component can include a wireless transceiver to receive the sensor data via wireless communication signals from the one or more sensors. This reduces the amount of physical wires or cables on the bicycle, which results in a lighter, more aerodynamic bicycle. This also reduces the cost of assembly and/or manufacture by eliminating the need to physically route wires or cables throughout the bicycle. Further, if certain ones of the sensors are removed from and/or new sensors are added to the bicycle, the suspension component can easily adapt to the new sensor data without having to change the wire or cable configurations. Moreover, physical wires or cables on a bicycle are prone to being caught or snagged by foreign objects (e.g., small tree branches) and ripped from the bicycle, which jeopardizes the reception of data that is important for maintaining control in dynamic environments. Wireless communication eliminates this drawback and ensures the reception of these important signals.

In some examples, the processor analyzes the sensor data and sets or selects values for a plurality of flags based on the sensor data. The flags represent different parameters of the bicycle state and riding environment, such as the presence of a medium vibration, a large vibration, a pitch angle of the bicycle, etc. For example, the presence of a medium or large vibration is indicative that the bicycle is riding over relatively large objects (e.g., bumps, rocks, etc.). The processor checks the values of the flags to determine whether to keep the suspension component in the same state or switch to a different state.

In some examples, the process or logic for checking the flags is different for each of the suspension states. This enables the suspension component to switch to different states based on different criteria. For example, when the bicycle is being pedaled, it may be advantageous to switch the damper to a higher damping level. However, when pedaling stops, it may be advantageous to switch the damper to a lower damping level to absorb any upcoming shocks or impacts.

In some examples, the processor determines whether to switch the suspension component between two states based on sensor data from a first time period and from a second time period, where the second time period is longer than the first time period. For example, the processor may analyze current acceleration data, which is indicative of the current or instantaneous vibration experienced by the bicycle. When the processor detects a large vibration, such as when riding over a rock, the suspension component can be immediately switched to a lower damping state to help absorb the impact. However, when riding on generally rougher terrain, there may be instances where little or no vibration is experienced. Therefore, the processor analyzes a larger set of the acceleration data over a longer period of time. The processor may determine the bicycle is riding on a rough terrain and, thus, may keep the suspension component in the low damping state, even if an instantaneous vibration is not being detected. These and other parameters for determining whether to switch suspension states are disclosed in further detail herein.

Turning now to the figures, FIG. 1 illustrates one example of a human powered vehicle on which the example components disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. In the illustrated example, the bicycle 100 includes a rear gear change device 134, such as a derailleur, that is disposed at or near the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In this example, the bicycle 100 includes a front (first) suspension component 136 and a rear (second) suspension component 138. The front and rear suspension components 136, 138 are shock absorbers (sometimes referred to as shocks). The front and rear suspension components 136, 138 absorb shocks while riding the bicycle 100. In this example, the front suspension component 136 is integrated into the front fork 108. The rear suspension component 138 is coupled between two portions of the frame 102, including a swing arm 140 coupled to the rear wheel 106. In other examples, the front suspension component 136 and/or the rear suspension component 138 may be integrated into the bicycle 100 in other configurations or arrangements. Further, in other examples, the bicycle 100 may include only one suspension component (e.g., only the front suspension component 136) or more than two suspension components (e.g., an additional suspension component on the seat post 112) in addition to or as an alternative to the front and rear suspension components 136, 138.

While the example bicycle 100 depicted in FIG. 1 is a type of mountain bicycle, the example suspension components and related methods disclosed herein can be implemented on other types of bicycles. For example, the disclosed suspension components may be used on road bicycles, as well as bicycles with mechanical (e.g., cable, hydraulic, pneumatic, etc.) and non-mechanical (e.g., wired, wireless) drive systems. The disclosed suspension components may also be implemented on other types of two-, three-, and four-wheeled human powered vehicles. Further, the example suspension components can be used on other types of vehicles, such as motorized vehicles (e.g., a motorcycle, a car, a truck, etc.).

The example bicycle 100 includes one or more components that can be used to monitor and/or control various aspects of the bicycle 100. These components can include controllable components and/or sensor components. In some examples, the components communicate wirelessly. In particular, the components can broadcast (transmit) data (e.g., sensor data) and/or other information to other components and/or receive data (e.g., sensor data) and/or other information from other components. In some examples, this information is used to control and/or adjust parameters of certain ones of the components of the bicycle 100. For example, the front suspension component 136 may be adjustable to increase or decrease a damping level, such as between two more damping states. In some examples, the front suspension component 136 can receive data (e.g., sensor data) from one or more other components and use the data to determine whether to switch or change damping states.

For example, the front suspension component 136 can receive sensor data from the rear suspension component 138. The rear suspension component 138 may include an accelerometer that produces acceleration data, which is indicative of vibration. The rear suspension component 138 may broadcast the acceleration data. The front suspension component 136 can use the acceleration data to determine whether to switch or change between damping states. As another example, the bicycle 100 includes a pedal detection sensor 142 (e.g., a cadence sensor) coupled to the crank assembly 120 (e.g., to the crank spindle). The pedal detection sensor 142 outputs pedal data that is indicative of the occurrence of pedaling and/or speed (e.g., revolutions-per-minute (RPM)) of pedaling. In some examples, the pedal detection sensor 142 includes an accelerometer. The acceleration data from the accelerometer can be used to determine whether the crank assembly 120 is rotating and/or the speed of rotation, which are indicative of the occurrence of pedaling and/or the speed of pedaling. In other examples, the pedal detection sensor 142 can include other types of sensors to track rotation and/or speed, such as a Hall Effect sensor. The pedal detection sensor 142 broadcasts the pedal data. The front suspension component 136 receives the pedal data and uses the pedal data to determine whether to switch or change between damping states. The bicycle 100 can include other controllable components and/or sensors associated with other components on the bicycle 100 such as the seat post 112, the brakes, the rear gear change device 134, etc.

Similarly, other components of the bicycle 100 can receive the broadcast data and use the data to control and/or adjust a parameter of the respective component. For example, the rear suspension component 138 can receive data (e.g., from the front suspension component 136, from the pedal detection sensor 142, etc.) and use the data to independently adjust the damping state of the rear suspension component 138.

In some examples, the data is received directly by a component and processed by the component. For example, the front suspension component 136 can include an internal processor for analyzing the data. In other examples, the data can be analyzed in another location, and then a command may be transmitted to the component. For example, the front suspension component 136 may analyze the data and send commands to the rear suspension component 138. Additionally or alternatively, a separate device may be provided, such as a controller 144. The controller 144 may receive the data, analyze the data, and/or transmit commands to one or more of the components. Therefore, the components may communicate directly with each other and/or via the controller 144. In some examples, the controller 144 provides an interface between the components and the user. The controller 144 can include a display to present various information and/or settings to a user (e.g., a rider). In some examples, the controller 144 is a device distinct from the bicycle 100, such as a handheld mobile computing device, a smartphone, or other computer. While in this example the components communicate wirelessly, in other examples, the bicycle 100 can include one or more wired connections (e.g., wires, cables, etc.) to communicatively couple the various components and/or the controller 144.

Figure 2:
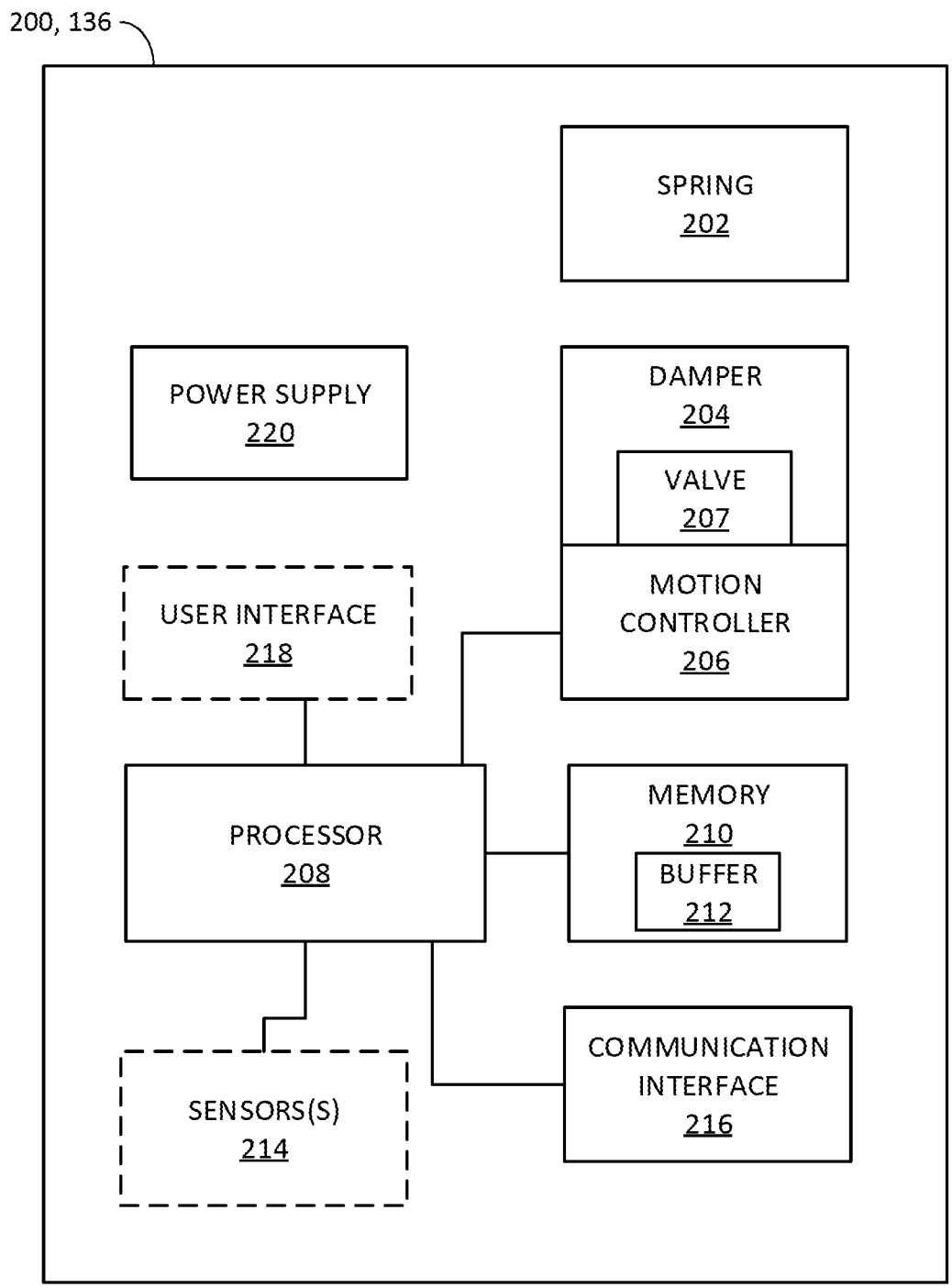
FIG. 2 is a block diagram of an example suspension component that can be implemented on the example bicycle of FIG. 1.

FIG. 2 is a block diagram of an example component 200 constructed in accordance with the teachings of this disclosure and which can be implemented on the bicycle 100 of FIG. 1. The example component 200 is a controllable component that can change parameters of the respective component. The example component 200 in FIG. 2 can represent the front suspension component 136 or the rear suspension component 138, for example. For clarity, the example component 200 is described in connection with the front suspension component 136. However, it is understood that any of the aspects disclosed in connection with the front suspension component 136 can likewise apply to the rear suspension component 138. Further, in other examples, the component 200 can represent other types of controllable components, such as the rear gear change device 134, a movable seat post component, a braking device, etc.

In the illustrated example, the front suspension component 136 includes electronic circuitry and an actuatable device (e.g., a valve) that can be used to change the suspension state of the front suspension component 136. In the illustrated example, the front suspension component 136 includes a spring 202 and a damper 204. The spring 202 operates (by compressing or expanding) to absorb vibrations or shocks, while the damper operates to dampen (slow) the movement of the spring 202. The front suspension component 136 can operate in different suspension states or modes to provide more or less impact absorption. In particular, in this example, the damper 204 is operable in two or more states to provide different levels of damping. In the examples disclosed herein, the damper is described as having three damping states, which are also referred to as suspension states. However, it is understood that the damper 204 can have any number of damping states, such as two damping states, four damping states, five damping states, etc. Examples of dampers with multiple damping states that may be implemented as the damper 204 are disclosed in U.S. Patent Publication No. 2019/0092421, titled "Controllable Cycle Suspension," and filed Sep. 24, 2018, which is hereby incorporated by reference in its entirety.

As mentioned above, in some examples, the damper 204 is operable between three damping states, including a first damping state, a second damping state, and a third damping state. The first, second, and third damping states are referred to herein as an open state, a pedal state, and a locked state, respectively. The damping states provide different levels of damping, which affect the operation of the front suspension component 136. For example, the open state may be considered a low damping state that provides relatively low (e.g., minimum) damping. Therefore, in the open state, the front suspension component 136 is easily compressible, which equates to a high level of shock and vibration absorption. As such, the open state is preferable when riding over larger bumps or rougher terrain, for example. However, the open state is typically not preferable when pedaling the bicycle 100 because the rider loses power as the front suspension component 136 compresses during pedaling.

The locked state may be considered a high damping state that provides relatively high (e.g., maximum) damping. In some examples, the locked state provides the highest amount of damping, which substantially limits movement of the front suspension component 136. However, in some examples, some movement (compression or expansion) of the front suspension component 136 is still possible in the locked state (e.g., under higher forces). The locked state is preferable when pedaling the bicycle 100 over a level and/or smooth surface. However, the locked state provides relatively low (e.g., minimal) shock absorption and, thus, is typically not preferable when riding over larger bumps or rougher terrain.

The pedal state is an intermediate damping state between the open state (low damping state) and the locked state (high damping state). The pedal state enables more movement than the locked state, but less movement than the open state. The pedal state may be preferable when pedaling the bicycle 100 while riding over medium sized bumps or terrain, for example. As can be appreciated, the different damping states may be preferable at different times based on the bicycle state and/or riding environment. For example, when pedaling, it is advantageous to have the front suspension component 136 in the pedal state or the locked stated rather than the open state. The pedal state and the locked state provide stiffer suspension than the open state, which reduces the amount of lost pedal power compared to the open state. However, when pedaling is not occurring, the front suspension component 136 can be switched back to the open state. This is advantageous because the front suspension component 136 can readily absorb any impacts that might occur, while not sacrificing pedaling power because the rider is not currently pedaling. The examples disclosed herein utilize sensor data to automatically change or switch the front suspension component 136 between the different suspension states to balance these goals. Therefore, the front suspension component 136 can be set to the most optimal suspension state for the current bicycle state and/or riding environment, without the need for rider input.

To switch or change the damper 204 between the open, pedal, and locked states, the front suspension component 136 includes a motion controller 206. The motion controller 206 is coupled to or integrated into the damper 204. The motion controller 206 can be implemented as any motion controlling device, such as a motor, an actuator (e.g., a hydraulic actuator), or a solenoid. In this example, the motion controller 206 is used to operate a valve 207 or other flow control member in the damper 204. For example, the valve 207 can be disposed in a hydraulic flow path in the damper 204. The motion controller 206 can be activated to move the valve 207 (e.g., a plug of the valve 207) to different valve states or positions to affect the flow of hydraulic fluid, thereby changing the damping rate of the damper 204. In some examples, the valve 207 is movable to three different positions that correspond to the open, pedal, and locked states. In other examples, the valve 207 can be moved to any number of positions for increasing or decreasing the damping level of the damper 204. Therefore, the motion controller 206 can be activated to change the damping state of the front suspension component 136.

In the illustrated example, the front suspension component 136 includes a processor 208 and a memory 210. The processor 208 analyzes data, such as sensor data, from one or more sensors and/or components to determine whether to adjust the suspension state of the front suspension component 136. The analysis may include filtering the data and/or comparing the data to one or more thresholds, as disclosed in further detail herein. The processor 208 controls the motion controller 206. In some examples, the processor 208 includes a motion controller interface for controlling the motion controller 206. The processor 208 can activate the motion controller 206 to change the damping state of the damper 204. Data from the one or more sensors is stored in the memory 210. In the illustrated example, the memory 210 includes a buffer 212. The buffer 212 can be used to temporarily store a certain amount of data, disclosed in further detail herein. In other examples, the buffer 212 may be implemented as a separate hardware component. The processor 208 executes instructions stored in the memory 210 to implement processes for analyzing the sensor data and determining a desired suspension state. Example processes stored in the memory 210 and implemented by the processor 208 are disclosed in further detail in connection with FIGS. 6-15.

As disclosed herein, the processor 208 analyzes sensor data from one or more sensors. In some examples, the processor 208 uses sensor data from one or more sensors that are part of or integral to the front suspension component 136. For example, as shown in FIG. 2, the front suspension component 136 includes one or more sensor(s) 214. In some examples, the sensor(s) 214 include an accelerometer. The accelerometer produces acceleration data that can be used by the processor 208 to determine whether to switch suspension states for increasing or decreasing damping. Additionally or alternatively, the sensor(s) 214 can include other types of sensors, such as a gyroscope, a magnetometer, a temperature sensor, and/or a pressure sensor. The sensor(s) 214 can communicate with the processor 208 via any wire or wireless communication network. In other examples, the front suspension component 136 may not include any integrated sensors.

In some examples, the processor 208 receives the sensor data from one or more sensors on the bicycle 100 that are remote or external to the front suspension component 136. In the illustrated example, the front suspension component 136 includes a communication interface 216. In some examples, the communication interface 216 is a wireless transceiver. The wireless transceiver receives signals (e.g., sensor data, commands, etc.) from one or more sensors and/or components on the bicycle 100 (FIG. 100) and/or other signals from any other device, such as a mobile phone. For example, the communication interface 216 can receive sensor data from the rear suspension component 138 (FIG. 1) and/or the pedal detection sensor 142 (FIG. 1). This reduces or eliminates the amount of physical wires or cables that would otherwise be needed to communicate the sensor data to the processor 208. Using physical wires and cables adds weight to the bicycle and also increases assembly and manufacture costs. Further, physical wires or cables on a bicycle are prone to being caught or snagged by foreign objects (e.g., small tree branches) and ripped from the bicycle, which jeopardizes the reception of data that is important for maintaining control in dynamic environments. Wireless communication eliminates these drawbacks and ensures the reception of these important signals.

The sensor data is stored in the memory 210 and analyzed by the processor 208. In some examples, the communication interface 216 can also transmit (e.g., broadcast) data to other sensors and/or components on the bicycle 100. For example, the communication interface 216 may transmit the sensor data from the sensor(s) 214 and/or transmits signals indicative of the state of the front suspension component 136 to the rear suspension component 138.

In some examples, the front suspension component 136 includes a user interface 218 that enables a user (e.g., a rider) to interact with the front suspension component 136. For example, the user interface 218 may indicate information to the user (e.g., the current state of the front suspension component 136). In some examples, the user interface 218 is used to change the suspension state (e.g., by clicking a button) based on user input. For example, the user interface 218 may receive a command from the user to switch the damper 204 into the open state (the low damping state). In such an instance, the processor 208 (and/or a motion controller interface) activates the motion controller 206 to switch the damper 204 into the open state. As disclosed in further detail herein, the processor 208 can operate in a mode in which the processor 208 receives and analyzes data to automatically adjust the state of the damper 204. In some examples, this automatic adjustment mode can be turned on or off. In some examples, the user interface 218 may be used to turn on or off the automatic adjustment mode. If the user desires to turn off the automatic adjustment mode, for example, the user may press a button and/or otherwise interact with the user interface 218 to deactivate the automatic adjust mode. Then, the user may control the damper 204 by entering manual commands into the user interface 218. The user can turn the automatic adjustment mode back on at a later time. The user interface 218 can include one or more buttons, keypad, keyboard, mouse, stylus pen, trackball, rocker switch, touch pad, voice recognition circuit, or other device or component for communicating data between a user and the front suspension component 136. The user interface 218 may be a touch screen, which may be capacitive or resistive. The user interface 218 may include a liquid crystal display ("LCD") panel, light emitting diode ("LED"), LED screen, thin film transistor screen, or another type of display. The user interface 218 may also include audio capabilities, or speakers. In some examples, the user interface 218 includes an LED indicator. The LED indicator emits light to indicate input of the commands or other actions of the front suspension component 136.

In the illustrated example, the front suspension component 136 includes a power supply 220 to supply power to the electrical components of the front suspension component 136, such as the motion controller 206, the processor 208, the sensor(s) 214, the communication interface 216, the user interface 218, etc. In some examples, the power supply 220 includes a stored power supply such as one or more batteries (e.g., a battery pack). The battery(ies) can be any type of battery, such as a AA battery, a AAA battery, a CR 2012 battery, a CR 2016 battery, etc. Such a stored power supply can be integrated into the front suspension component 136 and/or can be located elsewhere on the bicycle 100 (FIG. 1) (e.g., a battery coupled to the frame 102). Additionally or alternatively, the power supply 220 can be from a power generation device, such as a mechanical power generator, a solar panel, a fuel cell device, photo-voltaic cells, and/or other power generating devices implemented on the bicycle 100.

The processor 208 can include a general processor, digital signal processor, an application specific integrated circuit (ASIC), field programmable gate array (FPGA), analog circuitry, digital circuitry, combinations thereof, and/or or other now known or later developed processor. The processor 208 can be a single device or combinations of devices, such as through shared or parallel processing.

The memory 210 can be a volatile memory or a non-volatile memory. The memory 210 can include one or more of a read only memory (ROM), random access memory (RAM), a flash memory, an electrically erasable program read only memory (EEPROM), and/or other type of memory. The memory 210 can be removable from the front suspension component 136, such as a secure digital (SD) memory card. In some examples, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 210 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein. As used herein, the terms "non-transitory computer-readable medium" and "non-transitory machine-readable medium" are used interchangeably and are expressly defined to include any type of computer- or machine-readable storage device and/or storage disk and to exclude propagating signals and to exclude transmission media.

In an alternative example, dedicated hardware implementations, such as application specific integrated circuits, programmable logic arrays and other hardware devices, can be constructed to implement one or more of the methods disclosed herein. Applications that may include the apparatus and systems of various examples can broadly include a variety of electronic and computer systems. One or more examples disclosed herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The communication interface 216 provides for data and/or signal communication from the front suspension component 136 to another component of the bicycle 100 (FIG. 1), or an external device such as a mobile phone or other computing device. The communication interface 216 communicates the data using any operable connection. An operable connection may be one in which signals, physical communications, and/or logical communications may be sent and/or received. An operable connection may include a physical interface, an electrical interface, and/or a data interface. The communication interface 216 may be configured to communicate wirelessly, and as such include one or more antennae. In some examples, the communication interface 216 communicates wirelessly with one or more other devices using a dedicated connection. A dedicated connection provides robust communication of signals and data. An example dedicated connection can include a SRAMLINK™ connection using an AIREA™ lower power, spread spectrum wireless communication protocol. SRAMLINK™ and AIREA™ are provided by SRAM, LLC (a Delaware Limited Liability Company, with headquarters in Chicago, Illinois). The communication interface 216 can provide for wireless communications in any now known or later developed format. Although the present disclosure describes components and functions that may be implemented in particular embodiments with reference to particular standards and protocols, the present disclosure is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof.

In accordance with various examples of the present disclosure, methods described herein may be implemented with software programs executable by a computer system. Further, in exemplary, non-limited examples, implementations can include distributed processing, component/object distributed processing, and parallel processing. Alternatively, virtual computer system processing can be constructed to implement one or more of the methods or functionality described herein.

A computer program (also known as a program, software, software application, script, or code) can be written in any form of programming language, including compiled or interpreted languages, and can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this disclosure, including in any claims. As a further example, as used in this disclosure, the term "circuitry" also encompasses an implementation of a processor (or multiple processors) or portion of a processor and its (or their) accompanying software and/or firmware, as well as other electronic components. The term "circuitry" further encompasses, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or the front suspension component 136, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Figure 3:
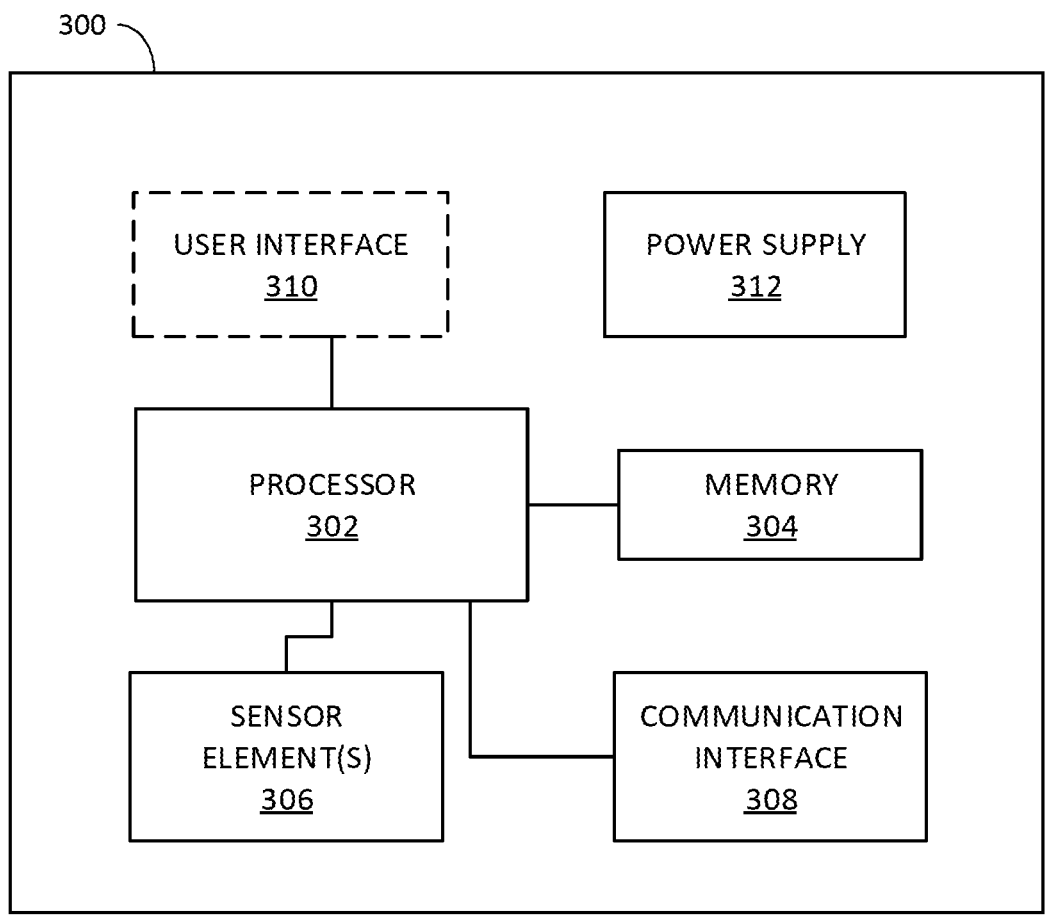
FIG. 3 is a block diagram of an example sensor that can be implemented on the example bicycle of FIG. 1.

FIG. 3 is a block diagram of an example sensor 300 constructed in accordance with the teachings of this disclosure and which can be implemented on the bicycle 100 of FIG. 1. Unlike the component 200 of FIG. 2, the sensor 300 does not include a motion controller. The sensor 300 senses one or more parameters and transmits (e.g., wirelessly) the sensor data. The sensor 300 can represent any sensor implemented on the bicycle 100, such as the pedal detection sensor 142, a tire pressure sensor, a wheel speed sensor, etc.

In the illustrated example, the sensor 300 includes a processor 302, a memory 304, one or more sensor element(s) 306, a communication interface 308, a user interface 310, and a power supply 312. The sensor elements(s) can include any sensing element, such as an accelerometer, a thermocouple, a pressure transducer, a gyroscope, a magnetometer, etc. For example, pedal detection sensor 142 (FIG. 1) can include an accelerometer that detects motion, which can be used to detect pedaling. The processor 302, the memory 304, the communication interface 308, the user interface 310, and the power supply 312 can be the same as the processor 208, the memory 210, the communication interface 216, the user interface 218, and the power supply 220 disclosed above in connection with FIG. 2. Therefore, any of the description of those components in FIG. 3 can likewise apply to the components in FIG. 3.

The processor 302 receives raw signals (e.g., analog signals) from the sensor element(s) 306. In some examples, the processor 302 performs one or more conditioning and/or filtering processes (e.g., A/D conversion, low-pass filtering, etc.) on the raw data signals before the sensor data is transmitted by the communication interface 308. In some examples, the processor 302 can execute one or more processes to determine a command for a component on the bicycle 100 (FIG. 1). For example, the communication interface 308 can receive sensor data from one or more other sensors or components on the bicycle 100. The processor 302 can analyze the sensor data and determine a state for a component, such as the front suspension component 136. The processor 302 can generate a command (e.g., change to a different state) and the communication interface 308 can transmit the command to the corresponding component to cause the change.

Figure 4:
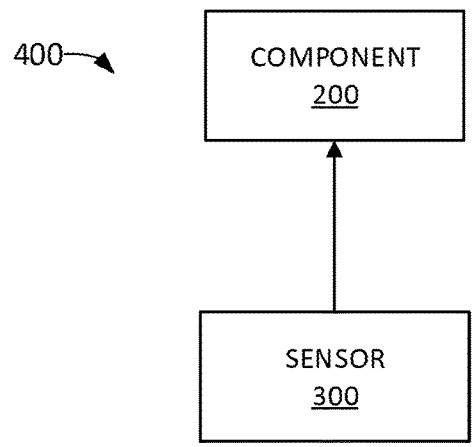
FIG. 4 is a block diagram of an example system including the example suspension component of FIG. 2 in communication with the example sensor of FIG. 3.

FIG. 4 is a block diagram of an example system 400 including the component 200 of FIG. 2 and the sensor 300 of FIG. 3. The sensor 300 transmits and/or otherwise broadcasts sensor data (e.g., via wired or wireless communication). The component 200 receives the sensor data from the sensor 300. The component 200 can analyze the sensor data and determine whether to make a change to the component 200. For example, the component 200 may be the front suspension component 136 (FIG. 1) and the sensor 300 may be the pedal detection sensor 142 (FIG. 1). The front suspension component 136 can analyze the pedal sensor data and determine whether to increase or decrease the damping level (e.g., switch to a different damping state).

Figure 5:
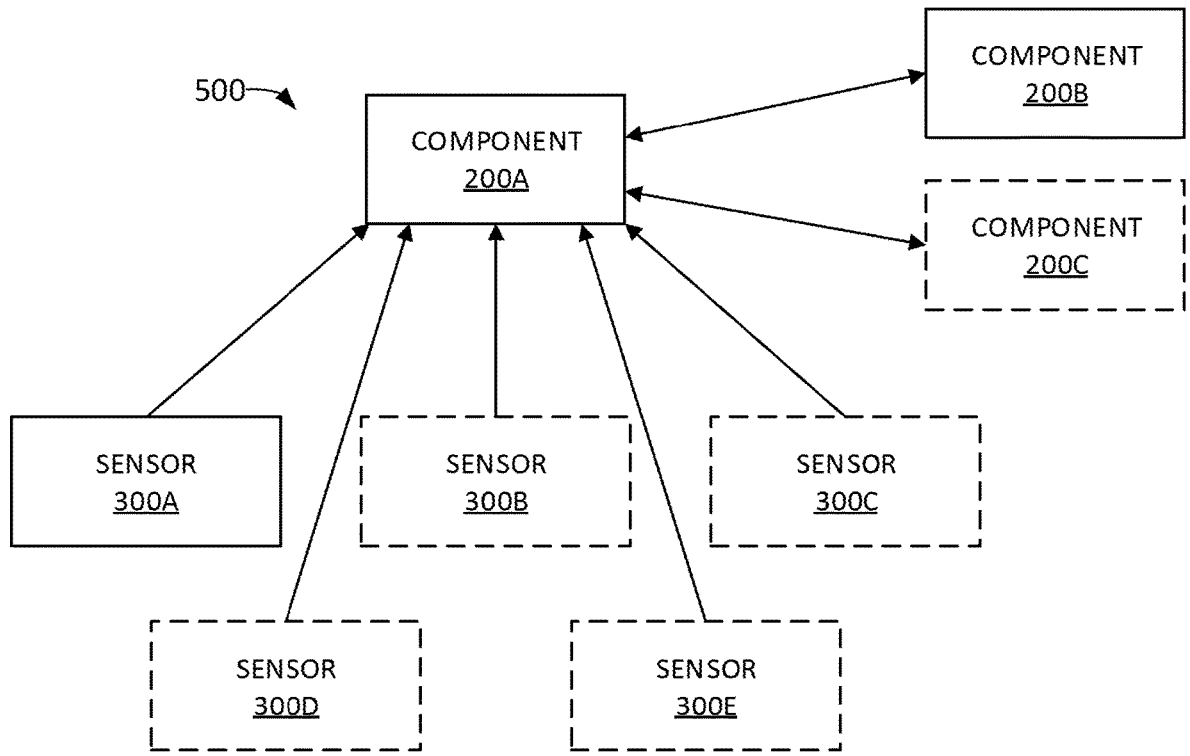
FIG. 5 is a block diagram of an example system including the example suspension component of FIG. 2 in communication with multiple examples components and sensors.

The component 200 can similarly receive sensor data and/or other information from one or more other sensors and/or components on the bicycle 100 (FIG. 1). For example, FIG. 5 is a block diagram of an example system 500 including a first component 200A, a second component 200B, and a first sensor 300A. The first sensor 300A and the second component 200B transmit and/or otherwise broadcast sensor data and/or other information (e.g., a state of a component) (e.g., via wired or wireless communication). The first component 200A receives the sensor data and/or other information from the first sensor 300A and the second component 200B. The first component 200A can analyze the sensor data and/or other information and determine whether to make a change to the first component 200A. For example, the first component 200A may be the front suspension component 136 (FIG. 1), the second component 200B may be the rear suspension component 138 (FIG. 1), and the first sensor 300A may be the pedal detection sensor 142 (FIG. 1). The front suspension component 136 can analyze the pedal sensor data from the pedal detection sensor 142 and the acceleration data from the rear suspension component 138 and determine whether to increase or decrease the damping level (e.g., switch to a different damping state).

The first component 200A can further receive sensor data and/or other information from additional sensors and components. For example, FIG. 5 shows a third component 200C, a second sensor 300B, a third sensor 300C, a fourth sensor 300D, and a fifth sensor 300E. Thus, the first component 200A can receive sensor data and/or other information from any number of sensors and/or components. Further, the first component 200A can communicate with the second and third components 200B, 200C. For example, the first component 200A can transmit sensor data (e.g., from an internal sensor, from one or more of the sensors 300A-300E) to the second and/or third components 200B, 200C. The second and/or third components 200B, 200C can similarly analyze the sensor data and determine whether to change states. Additionally or alternatively, the first component 200A can transmit commands to the second and/or third components 200B, 200C. For example, the first component 200A may determine that the second component 200B should change states and transmit a corresponding command to the second component 200B.

Flowcharts representative of example hardware logic, machine-readable instructions, hardware implemented state machines, and/or any combination thereof that can be implemented by the processor 208 of FIG. 2 are shown in FIGS. 6-15. The machine-readable instructions may be one or more executable programs or portion(s) of an executable program for execution by a computer processor such as the processor 208. The programs may be embodied in software stored on a non-transitory computer-readable storage medium such as a CD-ROM, a floppy disk, a hard drive, a DVD, a BLU-RAY DISC, or a memory (e.g., the memory 210) associated with the processor 208, but the entire program and/or parts thereof could alternatively be executed by a device other than the processor 208 and/or embodied in firmware or dedicated hardware. Further, although the example programs are described with reference to the flowcharts illustrated in FIGS. 6-15, many other methods of implementing the example processes may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-15 may be implemented using executable instructions (e.g., computer- and/or machine-readable instructions) stored on a non-transitory computer- and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

Figure 6:
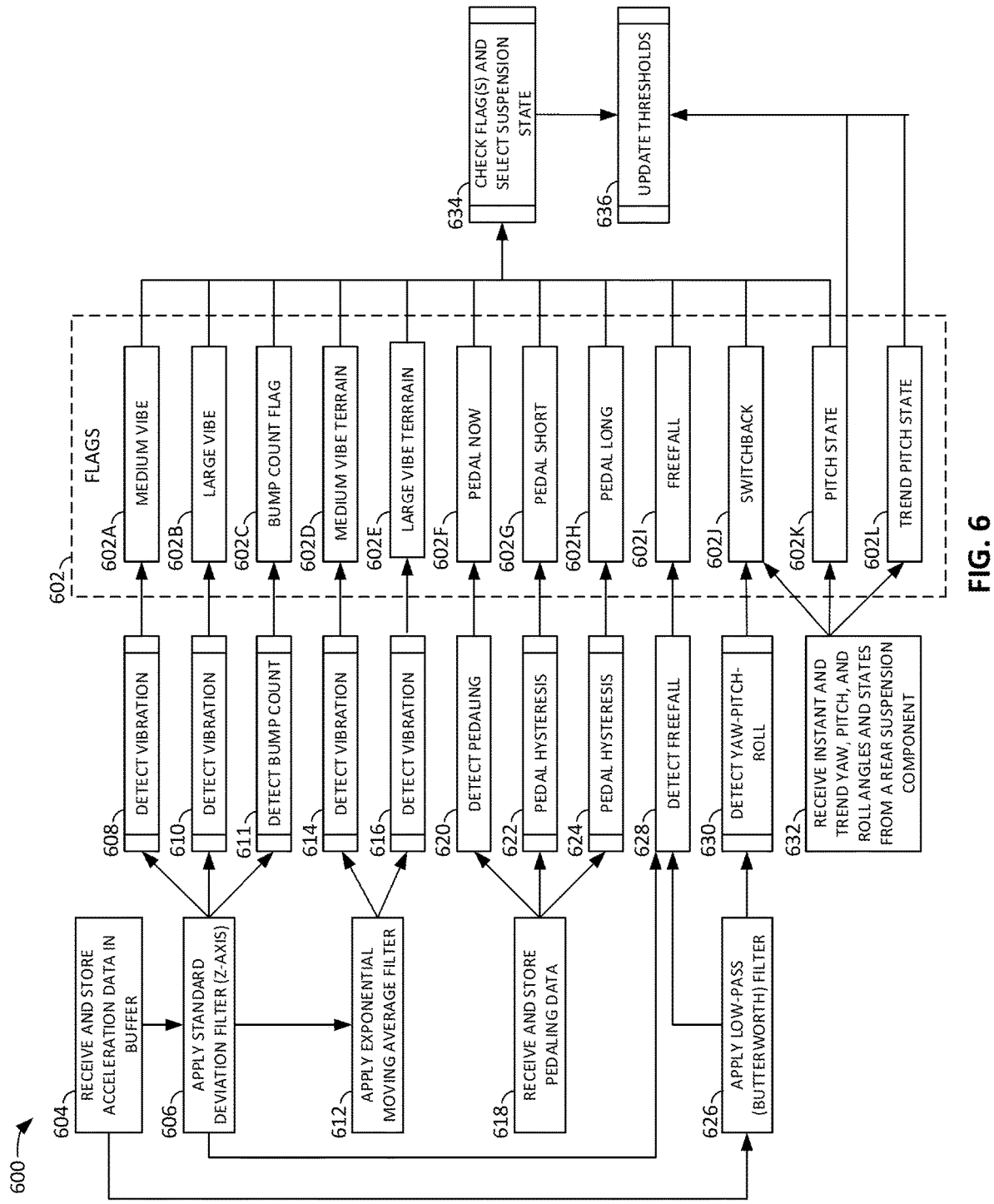
FIG. 6 is a flowchart of an example process implemented by an example processor of the example suspension component of FIG. 2 for adjusting a suspension state of the example suspension component.

FIG. 6 is a flowchart representative of an example process 600 implemented by the processor 208 of the front suspension component 136 of FIG. 2. In the example process 600, the processor 208 analyzes sensor data from one or more sensors and determines whether to change the damping level of the front suspension component 136 based on the sensor data. For example, the processor 208 can decide to stay in the current damping state or switch to a different damping state that provides a higher or lower amount of damping.

As disclosed in further detail, the example process 600 includes using the sensor data to set one or more flag(s) 602. The flag(s) 602 are representative of various parameters or characteristics associated with the state of the bicycle 100 and/or the riding environment of the bicycle. Each of the flags 602 may be set or selected as one of two or more values (e.g., states, levels, etc.) based on a level of the associated characteristic and/or whether the associated characteristic is present or not present (e.g., the presence or absence of pedaling). In some examples, the processor 208 selects values for the flags 602 based on comparisons of sensor data to thresholds. The processor 208 stores the current values of the flags 602 in the memory 210 (FIG. 2). The processor 208 then checks the flag values and determines, based on the flag values, whether to change the damping state of the damper 204 (FIG. 2) (e.g., by activing the motion controller 206). In the illustrated example, the flags 602 include a medium vibration flag 602A, a large vibration flag 602B, a bump count flag 602C, a medium vibration terrain flag 602D, a large vibration terrain flag 602E, a pedal now flag 602F, a pedal short flag 602G, a pedal long flag 302G, a freefall flag 602I, a switchback flag 602J, a pitch state flag 602K, and a trend pitch state flag 602L. In other examples, the process 600 can include the use of more or fewer flags. In many of the examples disclosed herein, certain ones of the flags 602 are described as having two states or values, referred to herein as the flag being set or clear. However, the two states or values can have any type of label, such as on and off, true and false, 0 and 1, etc. These states or values are indicative of a level, presence, and/or absence of a certain parameter, which is then used to determine whether to stay in the current suspension state or switch to a new suspension state. Thus, the flags 602 are used to qualify the raw sensor data for changing the suspension state.

In the example process 600, the processor 208 analyzes acceleration data and uses the acceleration data to set one or more of the flags 602. In some examples, the acceleration data is from an accelerometer in the front suspension component 136. For example, the accelerometer can correspond to the one of the sensor(s) 214 (FIG. 2) of the front suspension component 136. In some examples, the accelerometer is located on the sprung side of the bicycle 100 (e.g., on the upper part of the front fork 108 (FIG. 1)), as opposed to being located on the unsprung side (e.g., on the lower part of the front fork 108 at the front wheel 104 (FIG. 1)). In some examples, having the accelerometer on the sprung side of the bicycle 100 produces vibration data that more accurately reflects the riding environment and is less susceptible to certain characteristics (e.g., the weight) of the rider. However, in other examples, the accelerometer may be located on the unsprung side of the bicycle 100.

The acceleration data includes measurements from the accelerometer. These measurements are sampled or output at a particular frequency, such as 200 Hertz (Hz). As the processor 208 receives the measurements, the processor 208 stores all of the measurements in the memory 210 (FIG. 2). In addition, at block 604, the processor 208 stores a certain amount of recent measurements in the buffer 212 in the memory 210. For example, the buffer 212 may store multiple measurements. For example the buffer 212 may store 10-20 measurements. If the buffer 212 stores ten (10) samples and the measurements are sampled at 200 Hz (i.e., every 5 ms), for example, the buffer 212 may store the last 50 ms worth of acceleration data. The acceleration data in the buffer 212 represents the instant or current XYZ movement detected by the accelerometer. The buffer 212 is updated with the newest acceleration data measurement every 5 ms as a new acceleration data value is received. In other examples, the acceleration data can be sampled at a higher or lower frequency and/or the buffer 212 can store more or fewer samples (e.g., 1, 2, 3, 4, etc.), thereby representing a longer or shorter period of time.

At block 606, the processor 208 applies a filter to the Z (vertical) axis measurements. In this example, the processor 208 applies a standard deviation filter is applied to the Z (vertical) axis measurements of the acceleration data stored in the buffer 212. In other examples, the processor 208 can apply a different type of filter to the acceleration data. The processor 208 then analyzes the filtered acceleration data from block 606 to determine if a medium vibration and/or a large vibration is/are present. For example, at block 608, the processor 208 detects whether a medium vibration is present. In some examples, the processor 208 detects whether a medium vibration is present based on the filtered acceleration data from block 606. In some examples, the processor 208 detects whether a medium vibration is present by comparing the output value from block 606 to one or more thresholds. An example of the vibration detection process used at block 608 is disclosed in connection with FIG. 7. Based on the result of the vibration detection at block 608, the processor 208 selects the value for the medium vibration flag 602A. In this example, the medium vibration flag 602A can be selected as one of two values, referred to herein as being set or clear. If at least a medium sized vibration is detected at block 608, the processor 208 sets the medium vibration flag 602A or maintains the medium vibration flag 602A as set. If at least a medium sized vibration is not detected at block 608, the processor 208 clears the medium vibration flag 602A or maintains the medium vibration flag 602A as clear. Therefore, if the medium vibration flag 602A is set, it is indicative of at least a medium sized vibration occurring in the front suspension component 136 (in the Z (vertical) direction), such as when riding over a rock or bump, whereas if the medium vibration flag 602A is clear, it is indicative of little or no vibration occurring in the front suspension component 136 (in the Z (vertical) direction), such as when riding over a relatively level surface.

At block 610, the processor 208 detects whether a large vibration is present. In some examples, the processor 208 detects whether a large vibration is present based on the filtered acceleration data from block 606. In some examples, the processor 208 detects whether a large vibration is present by comparing the output value from block 606 to one or more thresholds. An example of the vibration detection process used at block 610 is disclosed in connection with FIG. 7. In some examples, the vibration detection processes at blocks 608 and 610 are the same, but utilize different thresholds. Based on the result of the vibration detection process at block 610, the processor 208 selects the value of the large vibration flag 602B. In this example, the large vibration flag 602B can be selected as one of two values, referred to herein as being set or clear. If at least a large sized vibration is detected at block 610, the processor 208 sets the large vibration flag 602B or maintains the large vibration flag 602B as set. If at least a large sized vibration is not detected at block 610, the processor 208 clears the large vibration flag 602B or maintains the large vibration flag 602B as clear. Therefore, if the large vibration flag 602B is set, it is indicative of at least a large sized vibration occurring in the front suspension component 136 (in the Z (vertical) direction), such as when riding over a large rock or bump, whereas if the large vibration flag 602B is clear, it is indicative that a large sized vibration is not occurring in the front suspension component 136 (in the Z (vertical) direction), such as when riding over less rough terrain. Because the medium and large vibration flags 602A, 602B are based on the acceleration data in the buffer 212 (FIG. 2), the medium and large vibration flags 602A, 602B represent the current or instantaneous vibration occurring in the front suspension component 136.

In the illustrated example, the processor 208, at block 611, detects whether a threshold number of bumps have occurred within a period of time. In some examples, the processor 208 detects whether the threshold number of bumps have occurred within the period of time based on the filtered acceleration data from block 606. An example of a bump count detection process implemented at block 611 is disclosed in connection with FIG. 10. Based on the result of the bump count detection process at block 611, the processor 208 selects a value for the bump count flag 602C. In this example, the bump count flag 602C can be selected as one of two values, referred to herein as being set or clear. If a threshold number of bumps have occurred within a period of time, the processor 208 sets the bump count flag 602C or maintains the bump count flag 602C as set. If a threshold number of bumps have not occurred within a period of time, the processor 208 clears the bump count flag 602C or maintains the bump count flag 602C as clear. Therefore, if the bump count flag 602C is set, it is indicative that the bicycle 100 (FIG. 1) has ridden over a certain number amount of bumps within a period of time, such as when riding down a bumpy road, whereas if the bump count flag 602C is clear, it is indicative that the bicycle 100 has not ridden over a certain number of bumps within a period of time, such as when riding on a relatively smooth road.

In addition to detecting the current or instantaneous vibration levels at blocks 608 and 610, the processor 208 also detects trend vibration levels, which are the presence of vibrations over a longer period of time. Trend vibrations can be indicative of riding over rougher terrain. In some examples, it is advantageous to consider the overall terrain, because although the front suspension component 136 may not be experiencing a current vibration, the bicycle 100 (FIG. 1) may be riding along a relatively rough path. As such, the front suspension component 136 can be kept in the open state or pedal state to help absorb at least some of the vibrations.

At block 612, the processor 208 applies an exponential moving average (EMA) filter to the filtered acceleration data from block 606 and prior filtered acceleration data. In some examples, all of the output values from block 606 over time are stored in the memory 210. In some examples, at block 612, the processor 208 applies the EMA filter to two or more of the output values from block 606 that have been recorded. In some examples, the processor 208 applies the EMA filter to all of the output values that have been recorded (i.e., all the acceleration data since the front suspension component 136 was first activated). In some examples, the EMA filter is an infinite impulse response filter. Such a filter weighs the data based on timing, such that data from more distant time periods is less influential on the overall calculation. As such, the processor 208 considers acceleration data occurring over a longer period of time. This enables the processor 208 to determine if the bicycle 100 is riding over a rougher terrain causing consistent vibration. If the bicycle 100 rides over a single bump, the EMA value may not rise enough to make a difference. However, if the bicycle 100 encounters many bumps, the EMA value gradually rises, which may cause the front suspension component 136 to change suspension states or prevent the front suspension component 136 from switching out of a particular suspension state, as disclosed in further detail herein.

The processor 208 then analyzes the sensor data to determine if the bicycle 100 (FIG. 1) is riding over a medium vibration terrain and/or a large vibration terrain. For example, at block 614, the processor 208 detects whether a medium vibration terrain is present. In some examples, the processor 208 detects whether a medium vibration terrain is present based on the filter acceleration data from block 612. In some examples, the processor 208 detects whether a medium vibration terrain is present by comparing the output value from block 612 to one or more thresholds. An example of the vibration detection process used at block 614 is disclosed in connection with FIG. 7. This process may be the same as the process performed at blocks 608 and 610. Based on the result of the vibration detection process at block 614, the processor 208 selects the value of the medium vibration terrain flag 602D. In this example, the medium vibration terrain flag 602D can be selected as one of two values, referred to herein as being set or clear. If at least a medium vibration terrain is detected at block 614, the processor 208 sets the medium vibration terrain flag 602D or maintains the medium vibration terrain flag 602D as set. If at least a medium vibration terrain is not detected at block 614, the processor 208 clears the medium vibration terrain flag 602D or maintains the medium vibration terrain flag 602D as clear. Therefore, if the medium vibration terrain flag 602D is set, it is indicative of the presence of at least a medium vibration terrain, such as when riding on a gravel road, whereas if the medium vibration terrain flag 602D is clear, it is indicative of a terrain causing little or no vibrations, such as when riding on a relatively smooth road.

At block 616, the processor 208 detects whether a large vibration terrain is present. In some examples, the processor 208 detects whether a large vibration terrain is present based on the filtered acceleration data from block 612. In some examples, the processor 208 detects whether a large vibration terrain is present by comparing the output value from block 612 to one or more thresholds. An example of the vibration detection process used at block 616 is disclosed in connection with FIG. 7. This process may be the same as the process performed at blocks 608, 610, and 614, but may use different thresholds. Based on the result of the vibration detection process at block 616, the processor 208 selects the value of the large vibration terrain flag 602E. In this example, the large vibration terrain flag 602E can be selected as one of two values, referred to herein as being set or clear. If at least a large vibration terrain is detected at block 616, the processor 208 sets the large vibration terrain flag 602E or maintains the large vibration terrain flag 602E as set. If at least a large vibration terrain is not detected at block 616, the processor 208 clears the large vibration terrain flag 602E or maintains the large vibration terrain flag 602E as clear. Therefore, if the large vibration terrain flag 602E is set, it is indicative of the presence of at least a large vibration terrain, such as when riding down a rocky hill, whereas if the large vibration terrain flag 602E is clear, it is indicative of a terrain causing lower vibrations. As disclosed above, each of the vibration detection processes occurring at blocks 608, 610, 614, 616 may be implemented by the process in FIG. 7. However, different thresholds may be used for each of the vibration detection processes.

As such, the process 600 utilizes sensor data (e.g., acceleration data) from a first time period (e.g., the acceleration data stored in the buffer 212) and sensor data from a second time period (e.g., all of the acceleration data) to determine whether to change damper states. The second time period is longer than the first time period. Further, the second time period includes the first time period and a period of time occurring prior to the first time period. For example, the first time period may be the time period covered by the acceleration data in the buffer 212, such as the last 50 ms. This represents the current or instantaneous vibration. The second time period is a longer period of time, which can include the acceleration data from a longer period of time, such as the last 100 ms, 500 ms, 1 s, 5 s, etc. In some examples, the second time period includes all of the acceleration data (e.g., all of the output values from block 606) since the front suspension component 136 was first activated (e.g., turned on). As disclosed in further detail, the processor 208 checks one or more of the flags 602 and determines whether to change the state of the damper 204. Therefore, the processor 208 may activate the motion controller 206 to change the damper between a first damping state and a second damping state based on sensor data from the first period of time and the second period of time. The processor 208 detects an amount of current vibration based on the sensor data from the first time period (e.g., at blocks 608 and/or 610) and detects an amount of vibration from a terrain based on the sensor data from the second time period (e.g., at blocks 614, 616). The processor 208 applies a standard deviation filter (at block 606) to the sensor data from the first time period to produce a first output value and applies an exponential moving average filter (at block 612) to the sensor data from the second time period to produce a second output value. At block 608, for example, the processor 208 compares the first output value to a first threshold to set the medium vibration flag 602A. At block 614, for example, the processor 208 compares the second output value to a second threshold to set the medium vibration terrain flag 602D. The processor 208 selects between different damping states based on the flags 602, as disclosed in further detail herein.

In addition to analyzing acceleration data from the accelerometer in the front suspension component 136, the example process 600 can also analyze and/or otherwise utilize sensor data from one or more other sensors. For example, at block 618, the processor 208 receives and stores pedaling data (also referred to as pedal sensor data or pedal data). In some examples, the pedaling data is indicative of whether the crank assembly 120 is rotating and/or the speed of rotation. In some examples, the pedaling data is from the pedal detection sensor 142, which wirelessly transmits the pedaling data to the front suspension component 136. Thus, the pedaling data can include measurements from the pedal detection sensor 142. These measurements are sampled or output at a particular frequency, such as 200 Hertz (Hz). In some examples, the measurements are sampled or output at the same frequency as the acceleration data from the accelerometer in the front suspension component 136. The processor 208 receives and stores the pedaling data in the memory 210 (FIG. 2). Additionally or alternatively, other types of sensors can be used to detect whether pedaling is occurring and/or the speed of such pedaling. For example, if a sensor is configured to measure or detect input power, such power input data can be used to indicate pedaling and/or speed of such pedaling.

The pedaling data can be used to select values for one or more of the flags 602. At block 620, the processor 208 detects whether pedaling is occurring based on the pedaling data. For example, if the pedaling data has a positive value (or a value above a threshold), it may be indicative that pedaling is occurring. Based on the result of the detection at block 620, the processor 208 selects the value of the pedal now flag 606E. In this example, the pedal now flag 606E can be selected as one of two values, referred to herein as being set or clear. If pedaling is detected at block 620, the processor 208 sets the pedal now flag 606E or maintains the pedal now flag 606E as set. If pedaling is not detected at block 620, the processor 208 clears the pedal now flag 606E or maintains the pedal now flag 606E as clear. Therefore, if the pedal now flag 602F is set, it is indicative of current or instantaneous pedaling, whereas if the pedaling now flag 602F is clear, it is indicative of no pedaling occurring.

In addition to detecting current or instantaneous pedaling at block 620, the processor 208 also determines whether pedaling has occurred over a shorter time period and a longer time period. At block 622, the processor 208 detects, based on the pedaling data, whether pedaling has occurred for at least a first amount of time or not occurred for at least a second amount of time. In some examples, the processor 208 uses a pedal hysteresis process that tracks the pedaling time. An example of the pedal hysteresis process used at block 622 is disclosed in connection with FIG. 8. Based on the result of the process at block 622, the processor 208 selects the value for the pedal short flag 602G. In this example, the short pedal flag 602G can be selected as one of two values, referred to herein as being set or clear. If consistent pedaling is detected for at least a first amount of time (e.g., a set time, described in further detail in connection with FIG. 8), the processor 208 sets the pedal flag 602F or maintains the pedal short flag 602G as set. If pedaling is not detected for at least a second amount of time (e.g., a clear time, described in further detail in connection with FIG. 8), the processor 208 clears the pedal short flag 602G or maintains the pedal short flag 602G as clear. Therefore, if the pedal short flag 602G is set, it is indicative that pedaling has occurred for at least the first amount of time, whereas if the pedal short flag 602G is clear, it is indicative that pedaling has not occurred for at least the second amount of time. In some examples, the first and second amounts of time are different. In other examples, the first and second amounts of time are the same.

At block 624, the processor 208 detects, based on the pedaling data, whether pedaling has occurred for at least a third amount of time or not occurred for at least a fourth amount of time. The third and fourth amounts of time may be greater than the first and second amounts of time used at block 622 for setting or clearing the pedal short flag 602G. In some examples, the processor 208 uses a pedal hysteresis process that tracks the pedaling time. An example of the pedal hysteresis process used at block 622 is disclosed in connection with FIG. 8. In some examples, the pedal hysteresis processes at blocks 622 and 624 are the same, but utilize different thresholds. Based on the result of the process at block 624, the processor 208 selects a value for the pedal long flag 602H. In this example, the pedal long flag 602H can be selected as one of two values, referred to herein as being set or clear. If pedaling is detected for at least a third amount of time (e.g., a set time, described in further detail in connection with FIG. 8), the processor 208 sets the pedal long flag 602H or maintains the pedal long flag 602H as set. If pedaling is not detected for at least a fourth amount of time (e.g., a clear time, described in further detail in connection with FIG. 8), the processor 208 clears the pedal long flag 602H or maintains the pedal long flag 602H as clear. Therefore, if the pedal long flag 602H is set, it is indicative that pedaling has occurred for at least the third amount of time, whereas if the pedal long flag 602H is clear, it is indicative that pedaling has not occurred for at least the fourth amount of time. In some examples, the third and fourth amounts of time are different. In other examples, the third and fourth amounts of time are the same.

In addition to analyzing acceleration data for vibration, the example process 600 may analyze and/or otherwise utilize acceleration data for other parameters to set other one of the flags 602. At block 626, the processor 208 applies a filter to the acceleration data in the buffer 212. In this example, the processor 208 applies a low-pass filter (e.g., a butterworth filter) to the acceleration data in the buffer 212. However, in other examples, the processor 208 can apply a different type of filter. At block 628, the processor 208 detects whether the bicycle 100 (FIG. 1) is in freefall based on the output of block 606 and the output of block 626. A freefall occurs when the bicycle 100 is not supported by an underlying surface, such as when a rider is jumping the bicycle 100 off of a rock. In some examples, the filtered data from block 606 (the standard deviation filter) is used to determine how much noise is in the data. In general, if the bicycle 100 is riding on the ground, the noise may be relatively high, whereas if the bicycle 100 is in a freefall, the noise is relatively low (e.g., at or near zero). The filtered data from block 626 (the low pass filter) is used to determine the magnitude of the gravity vector. The processor 208 compares the gravity vector values from the acceleration data to a threshold (e.g., the processor 208 performs a gravitational comparative). If the processor 208 determines the noise is low and the magnitude of gravity vector from the acceleration data is at or close to zero, the processor 208 determines the bicycle 100 is in a freefall. Additionally or alternatively, the processor 208 can use another technique to detect a freefall. For example, in some instances, even in a freefall, the gravity vector from the acceleration data may not go to zero because of input from the rider moving the bicycle 100 in the air. In such an example, the processor 208 may detect a freefall based on a crossing pattern of the X and Z vectors. Based on the result of the detection at block 628, the processor 208 selects the value for the freefall flag 602I. In this example, the freefall flag 602I can be selected as one of two values, referred to herein as being set or clear. If a freefall is detected at block 628, the processor 208 sets the freefall flag 602I or maintains the freefall flag 602I as set. If a freefall is not detected at block 628, the processor 208 clears the freefall flag 602I or maintains the freefall flag 602I as clear. Therefore, if the freefall flag 602I is set, it is indicative that the bicycle 100 is in a freefall state, whereas if the freefall flag 602I is clear, it is indicative that the bicycle 100 is not in a freefall state.

At block 630, the processor 208 calculates or determines parameters relating to yaw, pitch, and roll. In this example, the processor 208 calculates the instant and trend yaw, pitch, and roll angles for the front suspension component 136 based on the filtered data from block 626. At block 630, the processor 208 also determines instant and trend yaw, pitch, and roll states, based on the respective instant and trend yaw, pitch, and roll angles. The instant and trend yaw, pitch, and roll states are selected from a plurality of pre-defined states. An example of a yaw-pitch-roll detection process used at block 630 is disclosed in connection with FIG. 9.

In some examples, the same process at block 630 is performed by the processor of the rear suspension component 138 with the acceleration data collected at the rear suspension component. In particular, the rear suspension component 138 analyzes its own acceleration data (e.g., from an internal accelerometer) and determines its instant and trend yaw, pitch, and roll angles and states. The rear suspension component 138 transmits or broadcasts the instant and trend yaw, pitch, and roll angles and states. This process can occur at the same frequency that the processor 208 executes the process 600. At block 632, the processor 208 receives the instant and trend yaw, pitch, and roll angles and states from the rear suspension component 138 (e.g., via the communication interface 216 (FIG. 2)) and uses those angles and/or states for setting or selecting values for one or more of the flags 602.

Based on the results from block 630 and block 632, the processor 208 determines whether the bicycle 100 (FIG. 1) is turning. A turn may be defined by a change in direction of the bicycle 100 being beyond a predetermined threshold (e.g., >0°, >5° in either direction, >10° in either direction, etc.). For example, the processor 208 may compare the change in direction of the bicycle 100 to the threshold. The processor 208 may set one or more flags based on the comparison. In this example, the processor 208 determines whether the bicycle 100 is turning through a switchback and selects the value for the switchback flag 602J. In some examples, a switchback is defined as a turn of greater than 90°. In this example, the switchback flag 602J can be selected as one of two values, referred to herein as being set or clear. In some examples, the processor 208 detects the bicycle 100 is going through a switchback if the pitch state from the rear suspension component 138 is relatively high, and there is a relatively large difference between the roll state of the front suspension component 136 and the roll state of the rear suspension component 138. For example, while turning through a switchback (which usually has a steeper incline or decline), the rear portion of the bicycle 100 including the rear suspension component 138 has minimal roll, whereas the front suspension component 136 on the front fork 108 (FIG. 1) turns sharply and experiences high roll. This difference between the roll states can be compared to a threshold to determine if a switchback is occurring. Therefore, the processor 208 can detect a switchback based on acceleration data from the front and rear suspension components 136, 138. In other examples, the processor 208 can detect a switchback using other techniques. If a switchback is detected, the processor 208 sets the switchback flag 602J or maintains the switchback flag 602J as set. If a switchback is not detected, the processor 208 clears the switchback flag 602J or maintains the switchback flag 602J as clear. Therefore, if the switchback flag 602J is set, it is indicative that the bicycle 100 is turning through a switchback, whereas if the switchback flag 602J is clear, it is indicative that the bicycle 100 is not turning through a switchback. In other examples, in addition to or as an alternative to a switchback, the processor 208 can set one or more flags based on other turning angles.

The processor 208 also selects values for the pitch state flag 602K and the trend pitch state flag 602L. In this example, the processor 208 selects the values for the pitch state flag 602K and the trend pitch state flag 602L based on the pitch state and the trend pitch state from the rear suspension component 138. In particular, because the rear suspension component 138 is generally fixed in relation to the frame 102, the yaw, pitch, and roll of the rear suspension component 138 generally corresponds to the yaw, pitch, and roll of the entire bicycle 100. The pitch state is based on a calculated pitch angle and represents the current or instantaneous pitch of the bicycle 100. The pitch angle is the angle between the longitudinal axis of the bicycle 100 and the horizon. In this example, the pitch state can be one of seven states or values. Pitch state one represents a steep descent, pitch state two represents a medium descent, pitch state three represents a shallow descent, pitch state four represents a traversing movement, pitch state five represents a shallow ascent, pitch state six represents a medium ascent, and pitch state seven represents a steep ascent. Each of these pitch states represent a range of pitch angles. For example, pitch state one may include angles less than −15°, pitch state two may include angles of −6° to −15°, pitch state three may include angles of −2° to −5°, pitch state four may include angles of −1° to 1°, pitch state five may include angles of 2° to 5°, pitch state six may include angles of 6° to 15°, and pitch state seven may include angles of greater than 15°. The trend pitch state is similar to the pitch state but is measured over a period of time, which is indicative of whether the bicycle 100 is generally going uphill, downhill, or across level ground. The processor of the rear suspension component 138 may apply a short period EMA filter to past acceleration data to determine the trend pitch state. In some example, the trend pitch state can also be set to one of seven values similar to the pitch state, where each of the trend pitch states represents a range of trend pitch angles. In other examples, the pitch state and/or the trend pitch state can be divided into more or fewer states.

The processor 208 sets the value of the pitch state flag 602K to the value of the pitch state from the rear suspension component 138. For example, if the pitch state of the rear suspension component 138 is pitch state seven, the processor 208 sets the value of the pitch state flag 602K to seven. Similarly, the processor 208 sets the value of the trend pitch state flag 602K to the trend pitch state from the rear suspension component 138.

The example process 600 may include more or fewer flags. Further, in other examples, any of the flags 602 can have more or fewer values or states. At block 634, the processor 208 checks certain ones of the flags 602. An example of the process performed at block 634 is disclosed in further detail in connection with FIG. 11. In this example, all of the flags 602 except the trend pitch state flag 602L are considered at block 634. However, in other examples, the trend pitch state flag 602L may also be considered. Based on the values of the flags 602, the processor 208 selects a suspension state for the front suspension component 136. In some examples, at block 634, the processor 208 determines that the front suspension component 136 should stay in the same or current suspension state, in which case the front suspension component 136 remains in the current suspension state. In other examples, at block 634, the processor 208 determines that the front suspension component 136 should change or switch to a different suspension state, thereby increasing or decreasing the damping level. In such an example, the processor 208 activates the motion controller 206 (FIG. 2) to switch or change the damping state of the damper 204 (FIG. 2).

At block 636, the processor 208 updates one or more thresholds used in one or more of the detection processes. As disclosed in further detail herein, the vibration detection processes at blocks 608, 610, 614, 616 and the pedal hysteresis processes at blocks 622, 624 utilize certain thresholds. At block 636, the processor 208 updates the thresholds for the next execution. In some examples, the processor 208 updates the thresholds based on the current state of the front suspension component 136 (from block 634), the pitch state of the bicycle 100 (from the pitch state flag 602K), and/or the trend pitch state (from the trend pitch state flag 602L). An example of the process performed at block 636 is disclosed in connection with FIG. 15.

In some examples, the process 600 in FIG. 6 is executed repeatedly at a particular frequency. For example, the process 600 may be executed at a frequency of 200 Hz. Therefore, every 5 ms, the processor 208 analyzes the sensor data, selects values for the flags 602 (or keeps the flags 602 at their current value), determines whether the front suspension component 136 is to stay in the suspension state or change to a different suspension state, and updates the thresholds for the next execution. In other examples, the process 600 can be executed at a higher or lower frequency. In some examples, the frequency is based on the frequency at which the sensor data is received or generated. For example, if the acceleration data is generated at 200 Hz, the example process 600 can be executed at 200 Hz to analyze the new sensor data.

Figure 7:
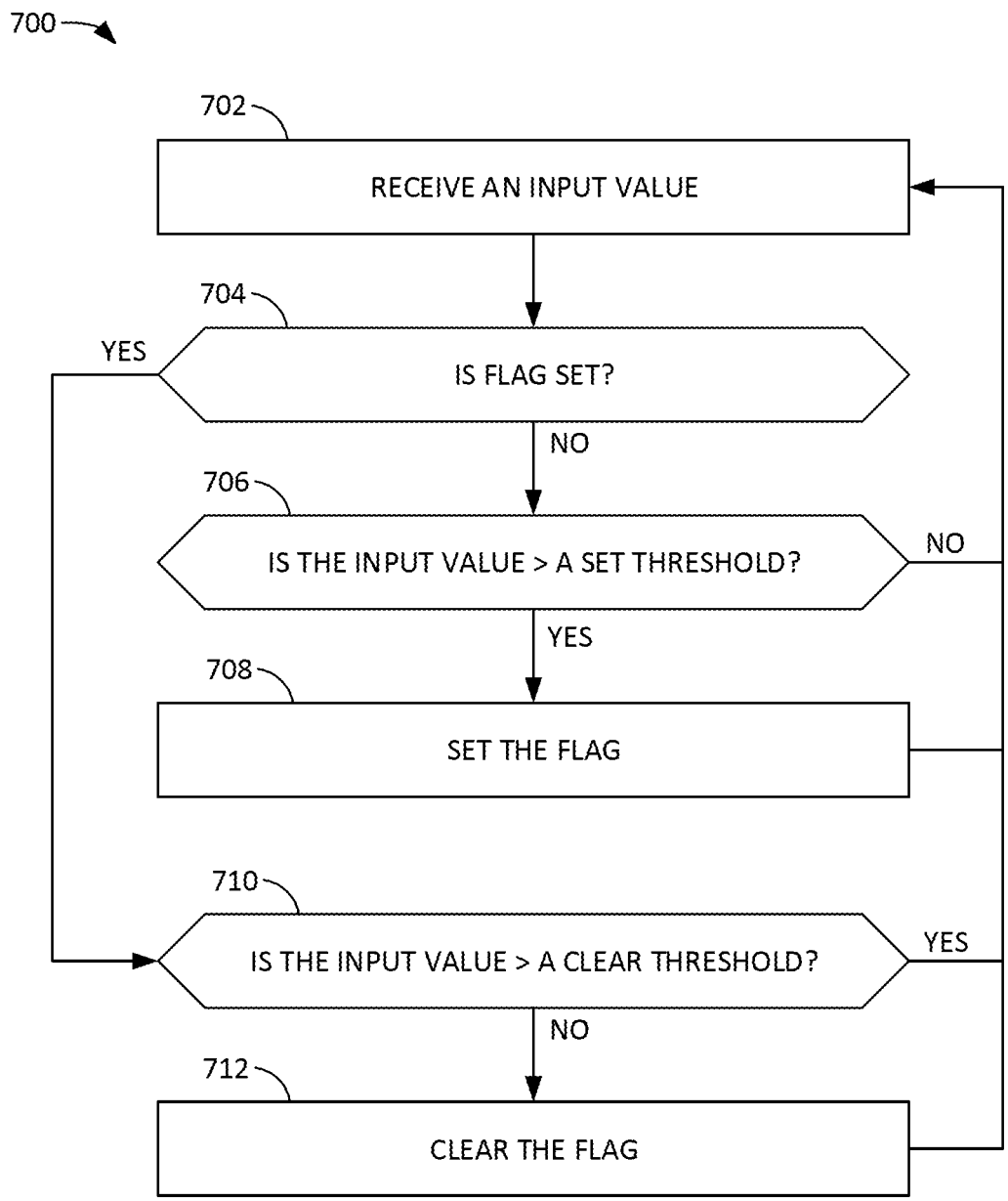
FIG. 7 is a flowchart of an example process implemented by the example processor of the example suspension component of FIG. 2 in the example process of FIG. 6 for setting an example flag associated with vibration.

FIG. 7 is a flowchart of an example vibration detection process 700 implemented by the processor 208 to select a value for a vibration flag. The example vibration detection process 700 is performed independently by the processor 208 at each of blocks 608, 610, 614, 616 of FIG. 6. The processes may be performed simultaneously or in series as separate processes in the processor 208. As described above, each of the medium vibration flag 602A, the large vibration flag 602B, the medium vibration terrain flag 602D, and the large vibration terrain flag 602E can be set or clear. The processor 208 implements the vibration detection processes 700 to set or clear the flags 602A, 620B, 620D, 620E. As disclosed in further detail below, the vibration detection process 700 utilizes a set threshold and a clear threshold. Each of the blocks 608, 610, 614, 616 may utilize different set and/or clear thresholds to set or clear the respective flags 602A-602E. For example, block 608 may use first values for the set and clear thresholds, block 610 may use second values for the set and clear thresholds (which can be larger than the first values), block 614 may use third values for the set and clear thresholds, and block 616 may use fourth values for the set and clear thresholds (which can be larger than the third values).

For clarity, the example vibration detection process 700 is described in connection with block 608 of FIG. 6 for setting or clearing the medium vibration flag 602A. However, it is understood that the example vibration detection process 700 is similarly performed in connection with the large vibration flag 602B, the medium vibration terrain flag 602D, and the large vibration terrain flag 602E.

In some examples, the set and clear thresholds are dynamically calculated by the processor 208. In some examples, the processor 208 calculates the set threshold based on (1) a base set threshold value, (2) a vibration dynamic bias value, and (3) a vibration auxiliary bias value. The vibration dynamic bias value and the vibration auxiliary bias value are determined at block 636 in FIG. 6. An example of this process is disclosed in further detail in connection with FIG. 15. The clear threshold is similarly calculated based on (1) a base clear threshold value, (2) the vibration dynamic bias value, and (3) the vibration auxiliary bias value. The base set and clear threshold values may be pre-stored in the memory 210 (FIG. 2) and/or may be provided by a user. The vibration dynamic bias value and the vibration auxiliary bias value can be added to or subtracted from the base set and clear threshold values to increase or decrease the respective set and clear thresholds. The vibration dynamic bias value and the vibration auxiliary bias value can change with the suspension state of the front suspension component 136 and the pitch state of the bicycle 100, as disclosed in further detail herein. Therefore, the set and clear thresholds can change dynamically. However, in other examples, the set and/or clear thresholds may be fixed.

At block 702, the processor 208 receives an input value. In this example, the input value is the output of block 606 of FIG. 6 (i.e., the filter acceleration data). At block 704, the processor 208 checks whether the medium vibration flag 602A is set. If the medium vibration flag 602A is not set, the processor 208, at block 706, determines whether the input value is greater than the set threshold. If the input value is not greater than the set threshold, control proceeds back to block 702, and the example vibration detection process 700 is repeated when the next input value is received. If the input value is greater than the set threshold, the processor 208, at block 708, sets the medium vibration flag 602A. The example process 700 is then repeated when the next input value is received.

If, at block 704, the processor 208 determines the medium vibration flag 608A is set, control proceeds to block 710. At block 710, the processor 208 determines whether the input value is greater than the clear threshold. If the input value is greater than the clear threshold, control proceeds back to block 702 and the example vibration detection process 700 is repeated when the next input value is received. If, at block 710, the processor 208 determines the input value is not greater than the clear threshold, control proceeds to block 712. At block 712, the processor 208 clears the medium vibration flag 602A, and then control proceeds back to block 702 and the example vibration detection process 700 is repeated when the next input value is received.

In some examples, the set threshold is higher than the clear threshold. As such, the threshold to initially set the medium vibration flag 602A is higher than the threshold to keep the medium vibration flag 602A set. In other words, once the medium vibration flag 602A is set, the threshold for keeping the medium vibration flag 602A set is lower. This creates a hysteresis band for the vibration detection process 700. In other examples, the set threshold and the clear threshold may be the same.

The example vibration detection process 700 can be repeated at the same frequency as the process 600 of FIG. 6. Additionally, in some examples, every time the example process 600 is executed, the processor 208 recalculates the set and clear thresholds. Therefore the set and clear thresholds can change dynamically as the suspension state and the state of the bicycle 100 changes. This enables the vibration detection process 700 to account for the effect that the suspension state and the state of the bicycle 100 have on vibration detection. For example, if the front suspension component 136 is in the open state, the accelerometer may generate different acceleration data than the accelerometer would generate if the front suspension component 136 was in the locked state while riding over the same size bump. Further, changing the set and clear thresholds can be used to help bias the suspension state toward a certain suspension state.

Figure 8:
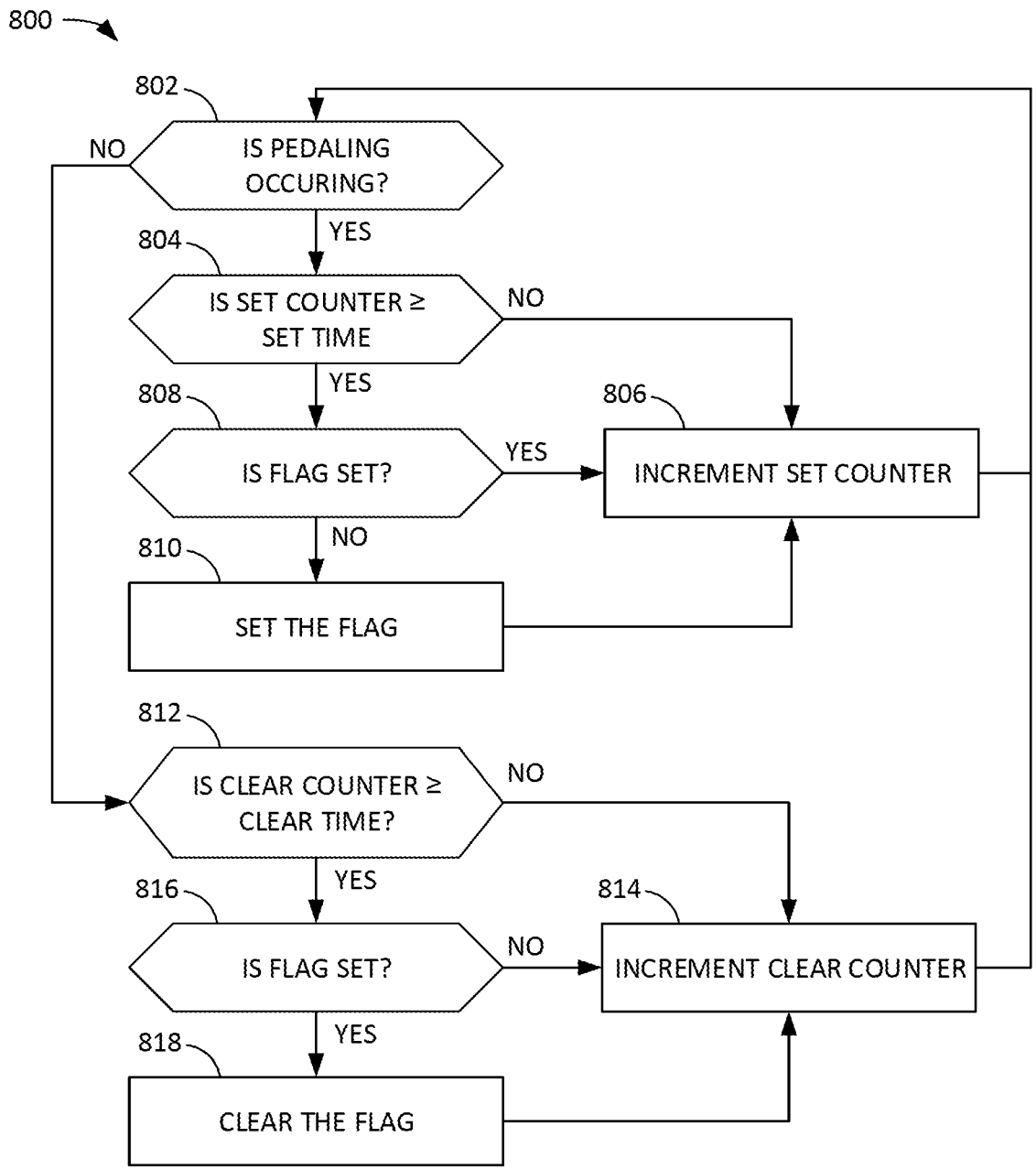
FIG. 8 is a flowchart of an example process implemented by the example processor of the example suspension component of FIG. 2 in the example process of FIG. 6 for setting an example flag associated with pedaling.

FIG. 8 is a flowchart of an example pedal hysteresis process 800 implemented by the processor 208 to select a value for a pedaling flag. The example pedal hysteresis process 800 is performed independently by the processor 208 at each of blocks 622 and 624 of FIG. 6. The processes may be performed simultaneously or in series as separate processes in the processor 208. As described above, each of the pedal short flag 602G and the pedal long flag 602H can be set or clear. As disclosed in further detail below, the pedal hysteresis process 800 utilizes a set time (a first threshold) and a clear time (a second threshold). The set time is used to determine when to set a flag and the clear time is used to determine when to clear a flag. The set and clear times are different for the pedal short detection process at block 622 and the pedal long detection process at block 624. For example, the pedal long detection process at block 624 may use a higher set time than the pedal short detection process at block 622.

For clarity, the example pedal hysteresis process 800 of FIG. 8 is described in connection with the pedal short detection process at block 622 for setting or clearing the pedal short flag 602G. However, it is understood that the example pedal hysteresis process 800 can be similarly performed in connection with the pedal long detection process at block 624 with the same or different set and/or clear times.

In some examples, the set and the clear times are dynamically calculated by the processor 208. In some examples, the processor 208 calculates the set time based on (1) a base set time value and (2) a set time bias value. The set time bias value can be added to or subtracted from the base set time value. The clear time is similarly calculated based on (1) a base set time value and (2) a clear time bias value. The set and clear time bias values are calculated at block 636 in FIG. 6. An example of this process is disclosed in further detail in connection with FIG. 15. The base set and clear time values may be pre-stored in the memory 210 (FIG. 2) and/or may be provided by a user. The set and clear time bias values can change with the pitch state of the bicycle 100, as disclosed in further detail herein. Therefore, the set and clear times can change dynamically. However, in other examples, the set and/or clear times may be fixed.

In some examples, the processor 208 tracks time using ticks or time increments. A tick or time increment occurs at a set frequency. For example, a tick or time increment may be counted every 5 ms. In some examples, the set time and the clear time are represented by a number of ticks or time increments. For example, the set time can be represented by a first number of ticks, and the clear time can be represented by a second number of ticks (which can be the same as or different than the first number of ticks). The processor 208 tracks the number of ticks since pedaling start and pedaling stopped. In particular, the processor 208 uses a set counter to track the number of ticks or time increments since pedaling started and a clear counter to track the number of ticks or time increments since pedaling stopped. Every time that pedaling is started (after being stopped), the set counter restarts and tracks the number of ticks while pedaling continues. Every time that pedaling stops (after pedaling has occurred), the clear counter restarts and tracks the number of ticks since the pedaling stopped. However, in other examples, the processor 208 can track the time using other techniques.

At block 802 of FIG. 8, the processor 208 determines whether pedaling is occurring. The processor 208 determines whether pedaling is occurring based on the pedaling data from the pedal detection sensor 142 (FIG. 1). If the processor 208 determines that pedaling is occurring, the processor 208, at block 804, determines whether the set counter is greater than or equal to the set time. As mentioned above, the set counter tracks the number of ticks or time increments since pedaling started. If the set counter is not greater than or equal to the set time, the processor 208, at block 806, increments the set counter by one tick or time increment and control proceeds back to block 802. The example process 800 is then repeated.

If the set counter is greater than or equal to the set time (indicating that consistent pedaling has occurred for at least the set time), the processor 208, at block 808, determines whether the pedal short flag 602G is set. If the pedal short flag 602 is set, the processor 208, at block 806, increments the set counter by one tick or time increment and control proceeds back to block 802. The example process 800 is then repeated. If the pedal short flag 602G is not set (i.e., the pedal short flag 602G is clear), the processor 208, at block 810, sets the pedal short flag 602G. Then, at block 806, the processor 208 increments the set counter by one tick or time increment and control proceeds back to block 802. The example process 800 is then repeated.

If, at block 802, the processor 208 determines that pedaling is not occurring, control proceeds to block 812. At block 812, the processor 208 determines whether the clear counter is greater than or equal to the clear time. If the clear counter is not greater than or equal to the clear time (indicating that pedaling has not stopped for the clear time), the processor 208, at block 814, increments the clear counter by one tick or time increment and control proceeds back to block 802. The example process 800 is then repeated.

If the clear counter is greater than or equal to the clear time, the processor 208, at block 816, determines whether the pedal short flag 602G is set. If the pedal short flag 802F is not set (i.e., the pedal short flag 602G is clear), the processor 208, at block 814, increments the clear counter by one tick or increment and control proceeds back to block 802. The example process 800 is then repeated. If the pedal short flag 602G is set, the processor 208, at block 818, clears the pedal short flag 602G. Then, the processor 208, at block 814, increments the clear counter by one tick or time increment and control proceeds back to block 802. The example process 800 is then repeated.

As an example of this process, assume the set time is 3 seconds, the clear time is 2 seconds, and the pedal short flag 602G is clear. The processor 208 checks whether pedaling is occurring and has occurred for 3 seconds (the set time). If pedaling is occurring but has not occurred consistently for 3 seconds (the set time), the pedal short flag 602G remains clear and the processor 208 continues to monitor the pedaling. Every time pedaling stops and starts again, the set counter is reset. When pedaling has occurred consistently for 3 seconds (the set time), the processor 208 sets the pedal short flag 602G. Thereafter, the pedal short flag 602G remains set. If pedaling stops, the processor 208 checks whether pedaling has stopped for 2 seconds (the clear time). Every time pedaling starts and stops again, the clear counter is reset. If pedaling has not stopped for 2 seconds (the clear time), the pedal short flag 602G remains set. If pedaling has stopped for more than 2 seconds (the clear time), the processor 208 clears the pedal short flag 602G. Therefore, if the pedal short flag 602G is clear, at least 3 seconds of constant pedaling is needed to set the pedal short flag 602G. Conversely, if the pedal short flag 602G is set, at least 2 seconds of no pedaling is needed to clear the pedal short flag 602G. In other examples, the set time and/or the clear time may be larger or smaller. In some examples, the set time and the clear time are equal. In other examples, the set time is greater than the clear time. In other examples, the clear time is greater than the set time.

The example pedal detection process 800 can be repeated at the same frequency as the process 600 of FIG. 6. Additionally, every time the example process 600 is executed, the processor 208 recalculates the set and clear times based on the set and clear time bias values. In some examples, this calculation is based on one or more parameters, such as the current pitch state of the bicycle 100 (e.g., indicated by the pitch state flag 602K). This enables the front suspension component 136 to switch to a different suspension state more quickly or less quickly depending on the pitch state. For example, if the pitch state indicates the bicycle 100 is pitched upward, such as when riding uphill, the set time bias value may reduce the set time (e.g., from 3 seconds to 2.5 seconds) and the clear time bias value may increase the clear time (e.g., from 2 seconds to 2.5 seconds). As such, the pedal short flag 602G is set more quickly, which enables the front suspension component 136 to switch to the locked state faster and stay in the locked state longer, which is more desirable when pedaling uphill. Conversely, if the pitch state indicates the bicycle 100 is pitched downward, such as when riding downhill, the set time bias value may increase the set time and the clear time bias value may reduce the clear time, which requires more pedaling to occur before switching to the locked state, thereby keeping the front suspension component 136 in the open state for a longer period of time. In other examples, the set and clear time bias values can be based on other parameters (e.g., the current suspension state, the current gear, etc.) in addition to or as an alternative to the current pitch state.

Figure 9:
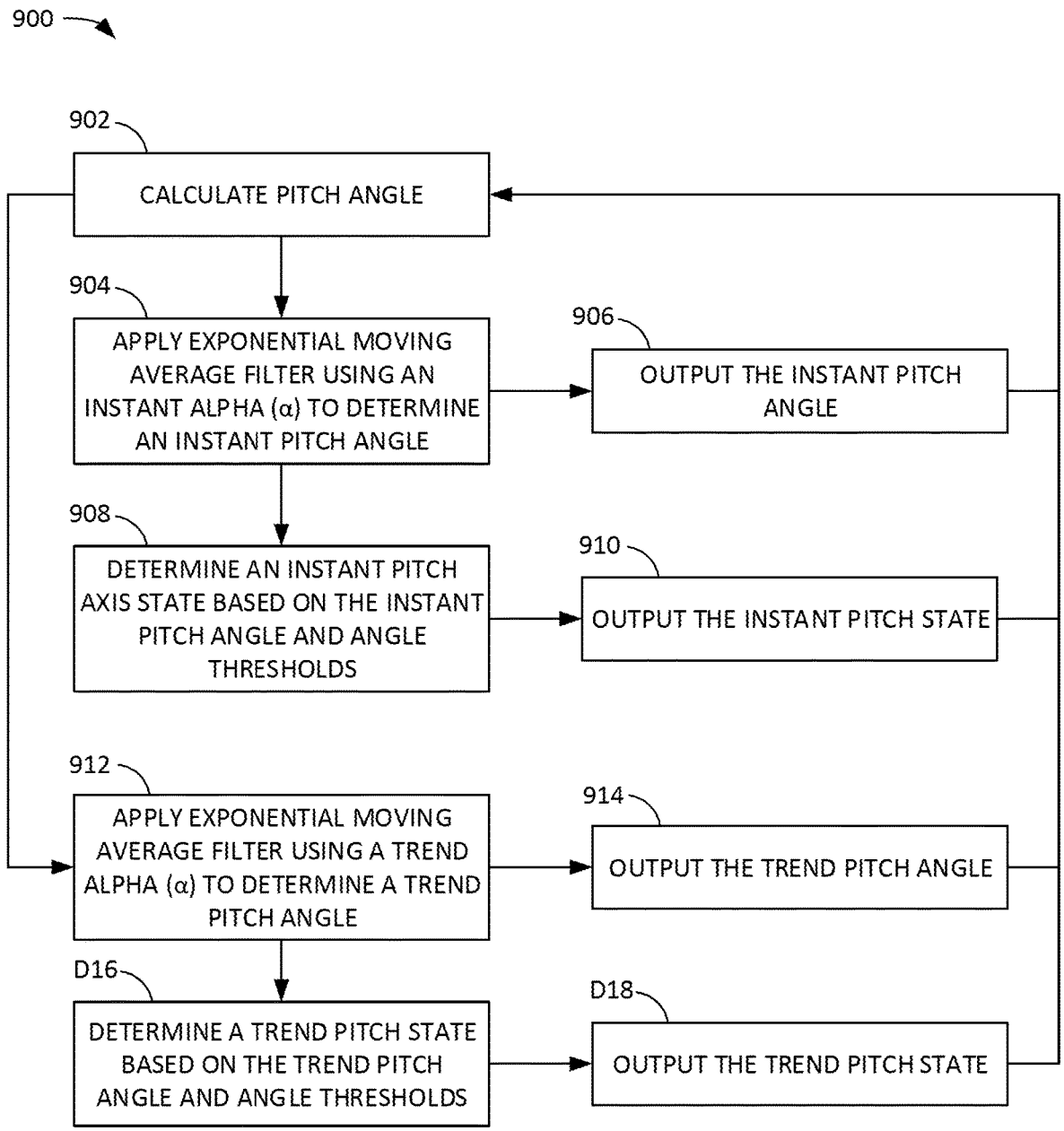
FIG. 9 is a flowchart of an example process implemented by the example processor of the example suspension component of FIG. 2 in the example process of FIG. 6 for setting an example flag associated with yaw, pitch, and/or roll.

FIG. 9 is a flowchart of an example angle detection process 900 implemented by the processor 208. The example angle detection process 900 is performed by the processor 208 at block 632 of FIG. 6. The example angle detection process 900 is performed by the processor 208 for yaw, pitch, and roll for the front suspension component 136. For example, the process 900 can be performed simultaneously or in series by the processor 208 for each of yaw, pitch, and roll for the front suspension component 136. Further, the same processes are performed by the processor of the rear suspension component 138 for each of yaw, pitch, and roll for the rear suspension component 136. For clarity, the example process 900 is describe in connection with pitch for the front suspension component 136. However, it is understood that the same process is also performed for yaw and roll for the front suspension component 136.

At block 902, the processor 208 calculates the pitch angle of the front suspension component 136 using the filtered acceleration data from the low-pass filter at block 626 in FIG. 6. In some instances, the calculated pitch angle is noisy. Therefore, at block 904, the processor 208 applies an EMA filter to the pitch angle using an instant alpha ($\alpha$) in the EMA calculation to determine an instant pitch angle. Applying the EMA filter helps smooth out the pitch angle. An example calculation implemented by the EMA filter is as follows: $y(n)=x(n)\cdot\alpha+y(n-1)\cdot(1-\alpha)$, where $y(n)$ is the latest output value, $x(n)$ is the latest acceleration sample (e.g., from the low-pass filter at block 626 in FIG. 6), $y(n-1)$ is the previous output value from the EMA filter, and $\alpha$ is the alpha value, where $\alpha<1$. For the instant pitch angle calculation, a relatively large $\alpha$ is used (e.g., close to 1). In some examples, at block 906, the processor 208 outputs the instant pitch angle of the front suspension component 136 to be used in one or more other processes.

After applying the EMA filter at block 904, the processor 208, at block 908, also determines an instant pitch state for the front suspension component 136 based on the instant pitch angle and a plurality of angle thresholds. For example, as described above, the instant pitch state may include seven pitch states, where each of the pitch states corresponds to a range of angles. The processor 208 compares the instant pitch angle to the thresholds to determine the corresponding instant pitch state. For example, pitch state six may correspond to pitch angles of 6° to 15°. If the instant pitch angle is 12°, the processor 208 determines the instant pitch state to be pitch state six. At block 910, the processor 208 outputs the instant pitch state. In some examples, the instant pitch state is used by the processor 208 for other processes. Additionally, the instant pitch state can be used to set values for one or more of the flags, such as the switchback flag 602J. Further, as described above, the processor 208 uses the instant pitch state from the rear suspension component 138 to set the pitch state flag 602K. For example, if the instant pitch state from the rear suspension component 138 is pitch state 6, the processor sets the pitch state flag 602K to a value of 6.

At block 912, the processor 208 applies an EMA filter to the pitch angle using a trend alpha ($\alpha$) in the EMA calculation to determine a trend pitch angle. The EMA calculation is the same as the EMA calculation disclosed above, but uses a smaller $\alpha$ value to weigh the older sample values more heavily. At block 914, the processor 208 outputs the trend pitch angle to be used in one or more other processes.

After applying the EMA filter at block 912, the processor 208, at block 916, determines a trend pitch state based on the trend pitch angle and a plurality of angle thresholds. Similar to the instant pitch state, the trend pitch state may include seven pitch states, where each of the trend pitch states corresponds to a range of trend pitch angles. At block 918, the processor 208 outputs the trend pitch state. In some examples, the trend pitch state is used by the processor 208 for other processes. Further, as described above, the processor 208 uses the trend pitch state from the rear suspension component 138 to set the trend pitch state flag 602L. The example process 900 is then repeated when the next output is received from the low-pass filter (block 626 of FIG. 6). The example process 900 can be repeated at the same frequency as the process 600 of FIG. 6.

Figure 10:
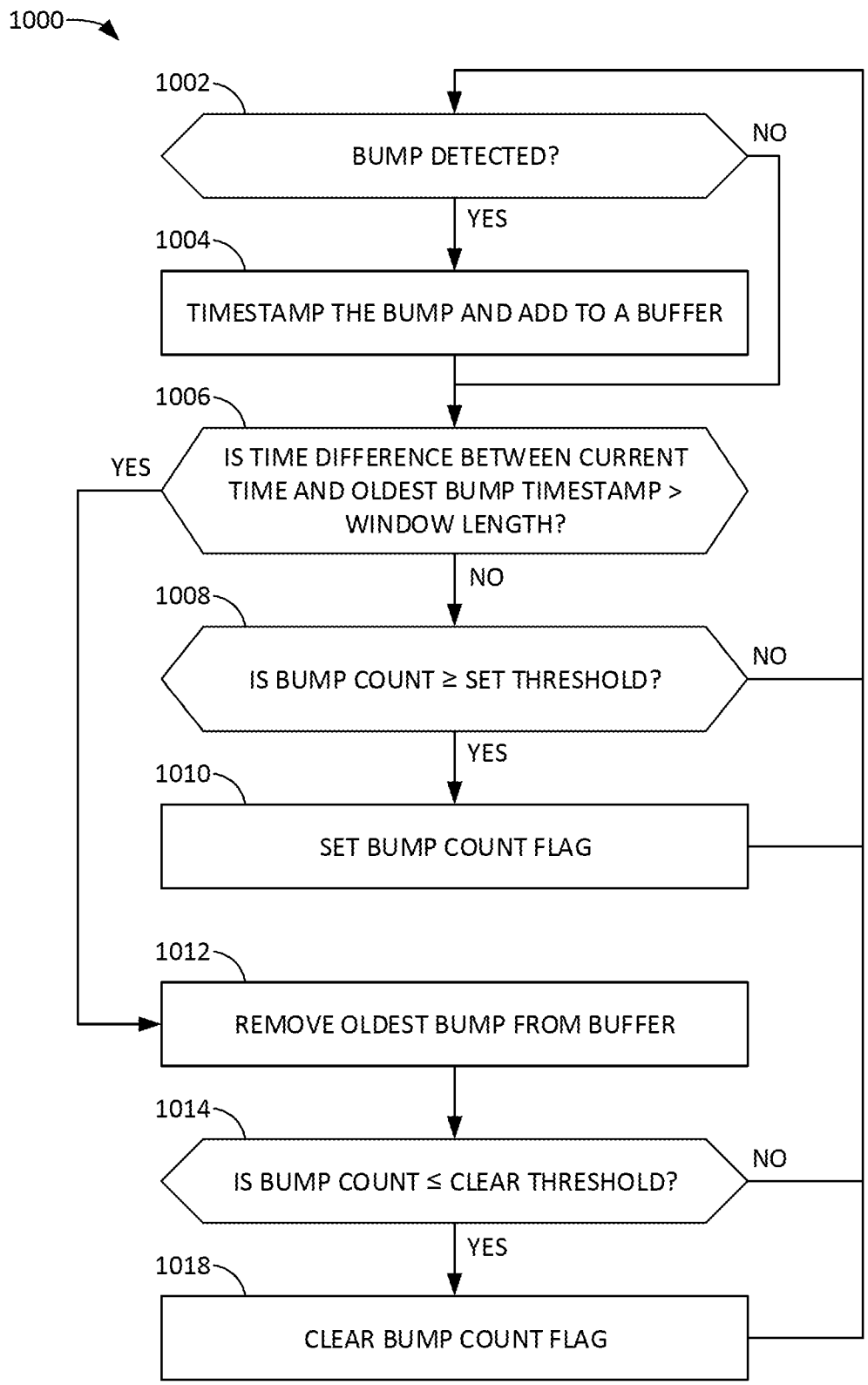
FIG. 10 is a flowchart of an example process implemented by the example processor of the example suspension component of FIG. 2 in the example process of FIG. 6 for setting an example flag associated with a bump count.

FIG. 10 is a flowchart of an example process 1000 implemented by the processor 208 to select a value for the bump count flag 602C. The example process 1000 is performed by the processor 208 at block 611 in FIG. 6. As described above, in this example, the bump count flag 602C can be set or clear.

At block 1002, the processor 208 detects whether the bicycle 100 has ridden over a bump. The processor 208 detects whether the bicycle 100 has ridden over a bump based on the output value of the filtered acceleration data of block 606 in FIG. 6. In some examples, the processor 208 detects whether a bump has occurred by comparing the output value to a threshold. For example, the processor 208 may determine a bump has occurred if the output value from the prior sample meets the threshold (e.g., is above the threshold) but the output value from the recent sample does not meet the threshold (e.g., is below the threshold). This signature (e.g., a spike) of the acceleration data is indicative of the bicycle 100 riding over a bump. The threshold can be set to any desired threshold depending on the desired size of bump to be detected. In other examples, the processor 208 can detect whether the bicycle 100 has ridden over a bump using other techniques.

If a bump is detected, the processor 208, at block 1004, timestamps the occurrence of the bump and saves the timestamp in a buffer (e.g., in the memory 210 (FIG. 2)). Whether a bump has been detected or not, control proceeds to block 1006. At block 1006, the processor 208 determines whether a time difference between the current time and an oldest bump timestamp in the buffer is greater than a certain period of time, referred to herein as a window length. The length of time of the window length can be stored in the memory 210 (FIG. 2), for example. If the time difference is not greater than the window length (i.e., all of the bump timestamps fall within the window length), the processor 208, at block 1008, determines whether a bump count is greater than or equal to a set threshold. The bump count is the number of bumps stored in the buffer and, thus, the number of bumps occurring within the window length. The set threshold is the threshold number of bumps needed to set the bump count flag 602C. If the bump count is not greater than or equal to the set threshold, control proceeds back to block 1002 and the example process 1000 is repeated when the next output value from the filter acceleration data is received. If the bump count is greater than or equal to the set threshold, the processor 208, at block 1010, sets the bump count flag 602C. This indicates a threshold number of bumps have occurred within the window length. The process 1000 is repeated at block 1002 when the next output value from the filter acceleration data is received. The bump count flag 602C remains set until the bump count falls below a clear threshold, described below.

If the time difference between the current time and the oldest bump timestamp is greater than the window length (determined at block 1008), the processor 208, at block 1012, removes the oldest bump from the buffer. Therefore, any bump falling outside of the window length is removed. As a result, only timestamps of bumps falling within the window length remain in the buffer. At block 1014, the processor 208 determines whether the bump count is less than or equal to a clear bump count threshold. The clear threshold is the threshold number of bumps needed to clear the bump count flag 602C. If the bump count is not less than or equal to the clear threshold, control proceeds back to block 1002 and the process 1000 is repeated when the next output value from the filter acceleration data is received. If the bump count is less than or equal to the clear threshold, the processor 208, at block 1016, clears the bump count flag 602C. This indicates a threshold number of bumps have not occurred within the window length. Control proceeds back to block 1002 and the process 1000 is repeated when the next output value front the filter acceleration data is received. The bump count flag 602C remains clear until the bump count meets the set threshold again.

In some examples, the set threshold is higher than the clear threshold. For example, the set threshold may be five bumps and the clear threshold may be two bumps. If the processor 208 detects five bumps within the window length, the processor 208 sets the bump count flag 602C. If the bumps cease, the bumps saved in the buffer are removed one-by-one as time passes. Once the number of bumps is less than or equal to two, the processor 208 clears the bump count flag 602C. This enables the bump count flag 602C to remain set until the amount of bumps subside. In other examples, the set threshold and the clear threshold may be the same number of bumps.

Figure 11:
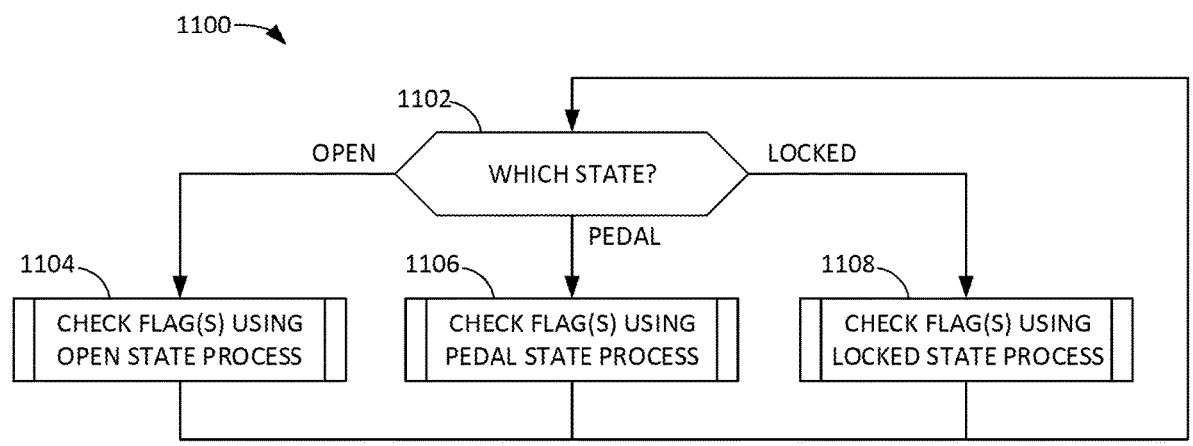
FIG. 11 is a flowchart of an example process implemented by the example processor of the example suspension component of FIG. 2 in the example process of FIG. 6 for determining a process to use for checking one or more example flags.
Figure 12:
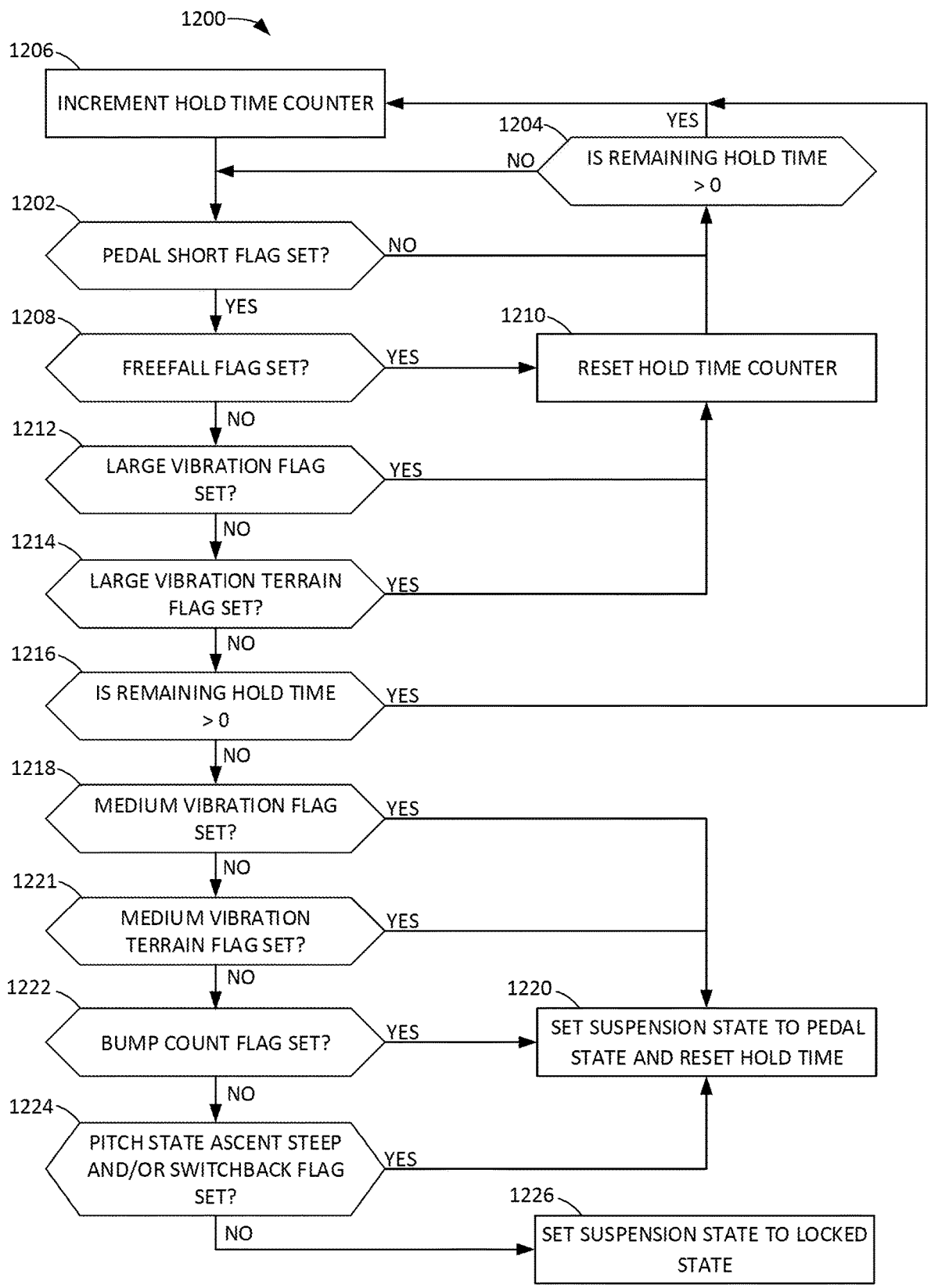
FIG. 12 is a flowchart of an example process implemented by the example processor of the example suspension component of FIG. 2 in the example process of FIG. 11 for checking one or more example flags when the example suspension component is in a first suspension state (an open state).
Figure 13:
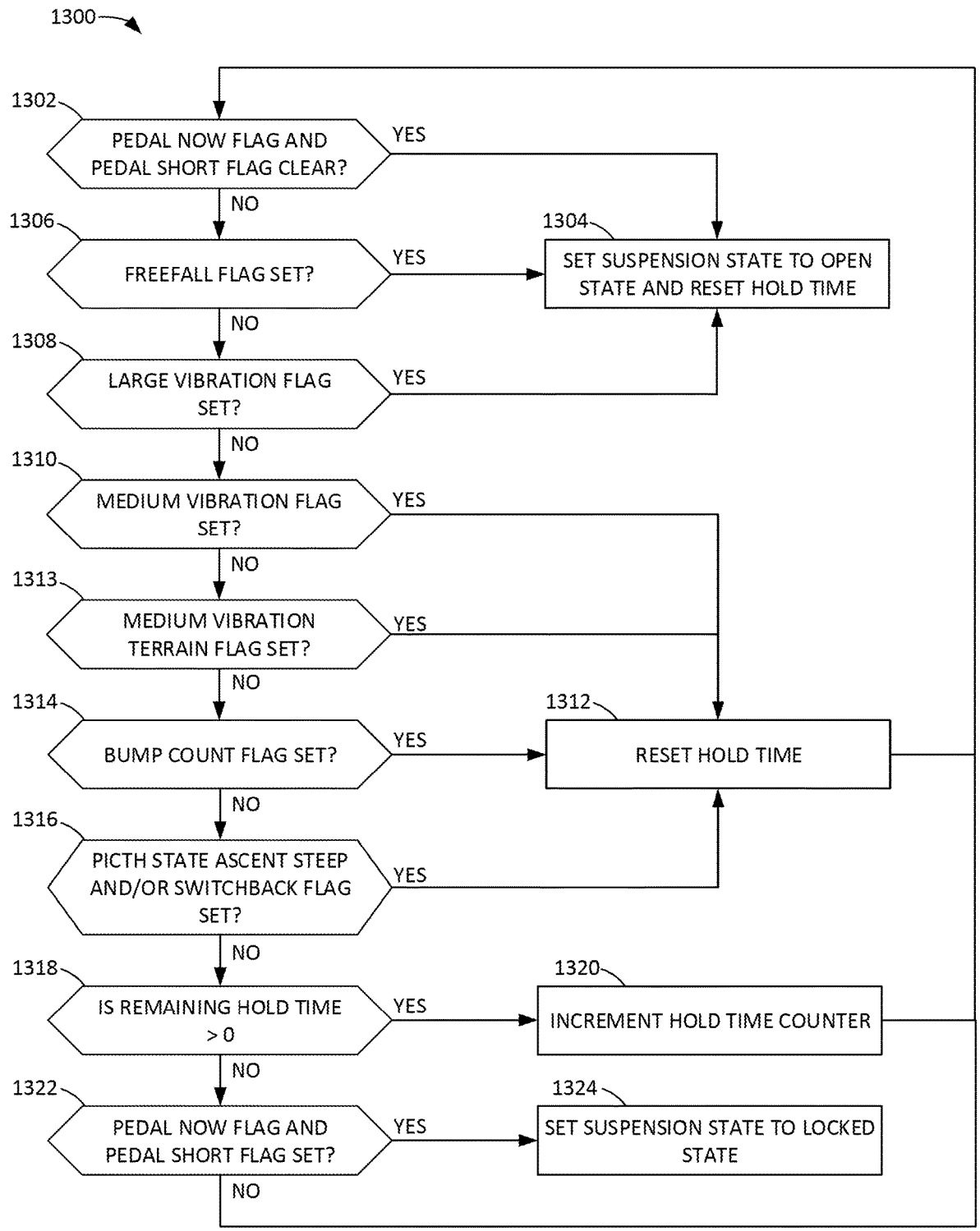
FIG. 13 is a flowchart of an example process implemented by the example processor of the example suspension component of FIG. 2 in the example process of FIG. 11 for checking one or more example flags when the example suspension component is in a second suspension state (a pedal state).
Figure 14:
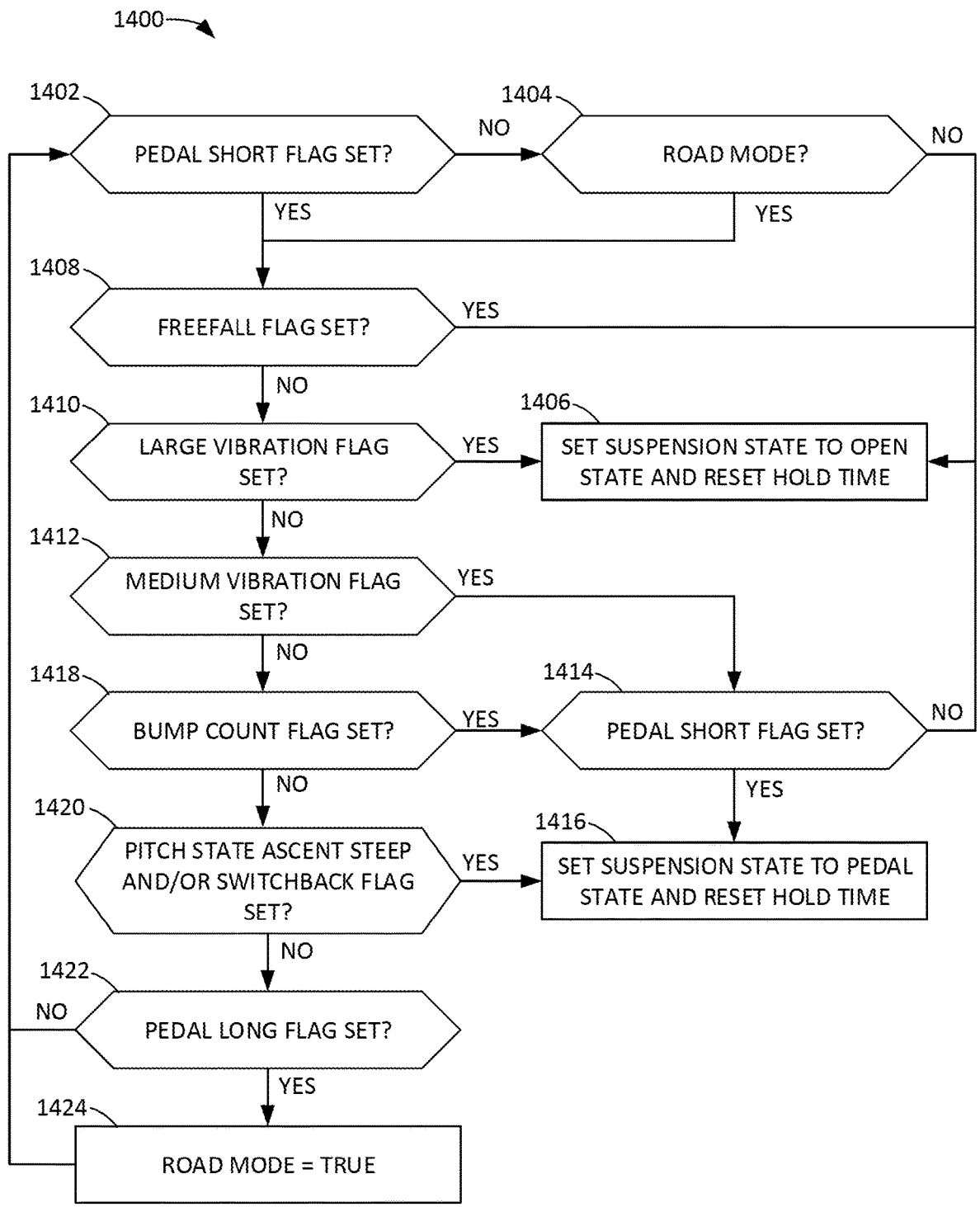
FIG. 14 is a flowchart of an example process implemented by the example processor of the example suspension component of FIG. 2 in the example process of FIG. 11 for checking one or more example flags when the example suspension component is in a third suspension state (a locked state).

FIG. 11 is a flowchart of an example process 1100 implemented by the processor 208 at block 634 of FIG. 6. Depending on the current state of the front suspension component 136, the processor 208 checks one or more of the flags 602 (e.g., the values of the flags 602) using a logic or process associated with the current state. FIGS. 12, 13, and 14 are flowcharts of example processes for each of the suspension states, which are disclosed in further detail herein. The states or values of the flags 602 are stored in the memory 210. In some examples, when the front suspension component 136 is first activated or turned on, the processor 208 sets the damper 204 to the open state. Over time, the processor 208 may switch the damper 204 between the different states in accordance with the different processes in FIGS. 12, 13 and 14.

At block 1102, the processor 208 determines the current state of the front suspension component 136. In some examples, the processor 208 saves an indication of the current suspension state in the memory 210 every time the suspension state is changed. Therefore, the processor 208 may determine the current suspension state by checking the current suspension state indicated in the memory 210. If the processor 208 determines the front suspension component 136 is in the open state, the processor 208, at block 1104, checks one or more of the flags 602 using an open state process. An example of the open state process is disclosed in connection with FIG. 12. This process may result in keeping the front suspension component 136 in the open state or switching the front suspension component 136 to one of the pedal or locked states (e.g., switching to a higher damping level).

If the processor 208 determines the front suspension component 136 is in the pedal state, the processor 208, at block 1106, checks one or more of the flags 602 using a pedal state process. An example of the pedal state process is disclosed in connection with FIG. 13. This process may result in keeping the front suspension component 136 in the pedal state or switching the front suspension component 136 to one of the open or locked states (e.g., switching to a lower damping level or a higher damping level).

If the processor 208 determines the front suspension component 136 is in the locked state, the processor 208, at block 1108, checks one or more of the flags 602 using a locked state process. An example of the locked state process is disclosed in connection with FIG. 14. This process may result in keeping the front suspension component 136 in the locked state or switching the front suspension component 136 to one of the open or pedal states (e.g., switching to a lower damping level).

As such, one or more of the flag(s) 602 are checked using different processes depending on the current suspension state. For example, when the damper 204 is in the open state (low damping state), the processor 208 checks the flags using a first process, when the damper 204 is in the pedal state (intermediate damping state), the processor 208 checks the flags using a second process that is different than the first process, and when the damper 204 is in the locked state (high damping state), the processor 208 checks the flags using a third process that is different than the first process and the second process. After the processor 208 checks the flag(s) 602 using one of the open, pedal, or locked state processes, the example process 1100 is repeated. The example process 1100 can be repeated at the same frequency as the process 600 of FIG. 6. One or more of the flags 602 may have changed, which can result in a change in state of the front suspension component 136.

FIG. 12 is an example open state process 1200 implemented by the processor 208 when the front suspension component 136 is in the open state. The example process 1200 is performed by the processor 208 at block 1102 in FIG. 11. As described in further detail below, the processor 208 checks the states or values of certain ones of the flags 602 and, depending on the states or values of the flags 602, the processor 208 determines whether to keep the front suspension component 136 in the open state or switch to one of the pedal state or the locked state.

When the front suspension component 136 is first switched into the open state, the processor 208 activates a hold time counter. The hold time counter counts down from a specific hold time. The hold time is an amount of time that the front suspension component 136 should stay in the open state after first switching to the open state. This prevents the front suspension component 136 from switching out of the open state too quickly. Further, if the front suspension component 136 controls the rear suspense component 138, this prevents the rear suspension component 138 from switching out of the open state to soon. For example, if the front wheel 104 hits a bump and experiences a vibration from the bump, the front and rear suspension components 136, 138 may be switched into their open states and held in their open states for at least the hold time so that the rear suspension component 138 can absorb the vibration as the rear wheel 106 (FIG. 1) goes over the bump. In some examples, the hold time is 1.5 seconds. In other examples, the hold time may be a larger or smaller time value. The hold time counter may be represented by ticks or time increments.

The example open state process 1200 starts at block 1202. At block 1202, the processor 208 checks whether the pedal short flag 602G is set. If the pedal short flag 602G is not set (i.e., the pedal short flag 602G is clear, indicating that pedaling has not occurred for a certain amount of time), the processor 208, at block 1204, determines whether the remaining hold time of the hold time counter is greater than zero. If the remaining hold time is greater than zero (indicating the hold time has not yet been met), the processor 208, at block 1206, increments the hold time counter. As such, the front suspension component 136 remains in the open state. The example process 1200 is then repeated starting at block 1202. If the remaining hold time is not greater than zero (indicating the hold time has been met), the front suspension component 136 stays in the open state and the example process 1200 is repeated starting at block 1202. Therefore, if the front suspension component 136 is in the open state and the pedal short flag 602G is not set, the front suspension component 136 remains in the open state. As a result, if the front suspension component 136 is in the open state and the rider is not pedaling for at least a short amount of time, the front suspension component 136 remains in the open state. This is advantageous so that the front suspension component 136 can absorb any upcoming bumps or vibrations while not sacrificing pedal power (because no pedaling is occurring).

If the pedal short flag 602G is set (indicating that pedaling has occurred for a certain amount of time), the processor 208, at block 1208, checks whether the freefall flag 602I is set. If the freefall flag 602I is set (indicating the bicycle 100 is in a freefall), the processor 208, at block 1210, resets the hold time counter. Control proceeds to block 1204 and the example process 1200 is repeated starting at block 1202. As such, if the bicycle 100 is in a freefall (even if pedaling is occurring), the front suspension component 136 remains in the open position so that the front suspension component 136 can provide relatively high (e.g., maximum) shock absorption when the bicycle 100 lands. Further, after a freefall is detected, the front suspension component 136 remains in the open state for at least the hold time, which prevents the front suspension component 136 from switching out of the open state too quickly (e.g., before the front suspension component 136 fully absorbs the landing shock).

If the freefall flag 602I is not set (i.e., the freefall flag 602I is clear, indicating the bicycle 100 is not in a freefall), the processor 208, at block 1212, checks whether the large vibration flag 602B is set. If the large vibration flag 602B is set (indicating at least a large vibration is being detected), the processor 208, at block 1210, resets the hold time counter. Control proceeds to block 1204 and the example process 1200 is repeated starting at block 1202. As such, if the bicycle 100 is experiencing a large vibration (even if pedaling is occurring), the front suspension component 136 remains in the open state. Further, the front suspension component 136 remains in the open state for at least the hold time, which prevents the front suspension component 136 from switching out of the open state too quickly.

If the large vibration flag 602B is not set (i.e., the large vibration flag 602B is clear, indicating a large vibration is not being detected), the processor 208, at block 1214, checks whether the large vibration terrain flag 602E is set. The large vibration terrain flag 602E indicates whether a large amount of vibration has been experienced over a period of time. If the large vibration terrain flag 602E is set (indicating the bicycle 100 is riding over generally rough terrain), the processor 208, at block 1210, resets the hold time counter. Control proceeds to block 1204 and then the example process 1200 is repeated starting at block 1202. As such, if the bicycle 100 is riding over rough terrain (even if pedaling is occurring), the front suspension component 136 remains in the open state. Using the large vibration terrain flag 602E helps keep the front suspension component 136 in the open state, even if the instantaneous vibrations have ceased. Therefore, if the bicycle 100 is riding over constant rough terrain that causes large vibrations, but experiences a short time with no vibrations, the front suspension component 136 remains in the open state in the anticipation of further large vibrations. Further, the front suspension component 136 remains in the open state for at least the hold time, which prevents the front suspension component 136 from switching out of the open state too quickly.

If the large vibration terrain flag 602E is not set (i.e., the large vibration terrain flag 602E is clear, indicating the bicycle 100 is not riding over rough terrain), the processor 208, at block 1214, checks whether the remaining hold time of the hold time counter is greater than zero, which is the same as block 1204. If the remaining hold time is greater than zero, control proceeds to block 1206, and the processor 208 increments the hold time counter. The example process 1200 is then repeated starting at block 1202. As such, if the rider is pedaling the bicycle 100, but the hold time threshold has not yet been met, the front suspension component 136 remains in the open state. As explained above, this ensures the front suspension component 136 remains in the open state for a sufficient amount of time to absorb vibrations before potentially switching to another state.

If the remaining hold time is not greater than zero, the processor 208, at block 1218, checks whether the medium vibration flag 602A is set. If the medium vibration flag 602A is set (indicating at least a medium amount of vibration is being detected), the processor 208, at block 1220, sets the suspension state to the pedal state. The processor 208 sets the suspension state to the pedal state by activating the motion controller 206 to move the valve 207 to a position that corresponds to the pedal state (the intermediate damping state). As such, if the rider is pedaling the bicycle 100, and the bicycle 100 is experiencing medium vibration, the processor 208 switches the front suspension component 136 into the pedal state, which is a higher damping state than the open state. This is generally preferred over the open state when pedaling the bicycle 100. Once the front suspension component 136 is in the pedal state, the processor 208 checks one or more of the flag(s) 602 using a pedal state process, which is disclosed in connection with FIG. 13. At block 1220, the processor 208 also resets a hold time counter used in the pedal state process. The hold time counter can be used to prevent the front suspension component 136 from switching out of the pedal state too quickly (e.g., see block 1318 of FIG. 13).

If the medium vibration flag 602A is not set (i.e., the medium vibration flag 602A is clear, indicating at least a medium vibration is not being detected), the processor, at block 1221, checks the medium vibration terrain flag 602D is set. If the medium vibration terrain flag 602D is set (indicating the bicycle 100 is riding over terrain causing at least a medium amount of vibration), the processor 208, at block 1220, sets the suspension state to the pedal state and resets the hold time counter for the pedal state process. Therefore, if the rider is pedaling the bicycle 100, and the bicycle 100 has experienced a medium amount of vibration over a period of time (even if not currently experiencing vibration), the processor 208 switches the front suspension component 136 into the pedal state.

If the medium vibration terrain flag 602D is not set (i.e., the medium vibration terrain flag 602D is clear, indicating low or no vibration over a period of time), the processor 208, at block 1222, checks whether the bump count flag 602C is set. If the bump count flag 602C is set (indicating that a threshold number of bumps have occurred within a period of time), the processor 208, at block 1220, sets the suspension state to the pedal state and resets the hold time for the pedal state process. Therefore, if the rider is pedaling the bicycle 100, and the bicycle 100 has experienced a threshold number of bumps over a period of time (even if not currently experiencing vibration), the processor 208 switches the front suspension component 136 into the pedal state. The bump count flag 602C can account for bumps or vibrations that may not have triggered the medium vibration terrain flag 602D. For example, if riding relatively slowly over consistent bumps, the threshold in the vibration detection process for the medium vibration terrain flag 602D may not be met, so the medium vibration terrain flag 602D is not set. However, it may still be desirable to switch the front suspension component 136 to the pedal state (rather than the locked state) to absorb some of the vibration. The bump count process detects the occurrence of these bumps and can set the bump count flag 602C to enable the front suspension component 136 to switch to the pedal state.

If the bump count flag 602C is not set (i.e., the bump count flag 602C is clear), the processor 208, at block 1224, checks whether the pitch state flag 602K indicates a steep ascent and/or the switchback flag 602J is set. As described above, in some examples, the pitch state flag 602K can be set to one of multiple pitch state values. One of the values (e.g., pitch state value seven) indicates a steep ascent. If the processor 208 determines the pitch state flag 602K is at such a value, and/or the switchback flag 602J is set (indicating a switchback has occurred), the processor 208, at block 1220, sets the suspension state to the pedal state and resets the hold time. Therefore, when pedaling up a steep hill or around a switchback, the front suspension component 136 is switched to the pedal state, which is generally preferred over the open state because the front suspension component 136 provides some support while pedaling. As such, the processor 208 determines a pitch angle of the bicycle 100 (e.g., at block(s) 630 and/or 632 of FIG. 6) and changes a damping level of the damper 204 of the front suspension component 136 based on a pitch angle of the bicycle 100.

If the pitch state does not indicate a steep ascent and the switchback flag 602J is not set (i.e., the switchback flag 602J is clear, indicating a switchback has not occurred), the processor 208, at block 1226, sets the suspension state to the locked state. The processor 208 may set the suspension state to the locked state by activating the motion controller 206 to move the valve 207 to a position that corresponds to the locked state (the high damping state). Therefore, if the bicycle 100 is riding over relatively level and/or smooth ground, with little or no vibrations over a period of time, the front suspension component 136 switches to the locked state. This is generally preferred as the lock state enables the most efficient pedaling. As such, the processor 208 determines a rider is pedaling (e.g., at block 620 of FIG. 6) and changes a damping level of the damper 204 of the front suspension component 136 based on the determination the rider is pedaling the bicycle 100. Once the front suspension component 136 is in the locked state, the processor 208 checks one or more of the flag(s) 602 using a locked state process, which is disclosed in connection with FIG. 14.

As can be appreciated from FIG. 12, some of the example flags 602 may be considered more important to the process 1200 than other ones of the flags 602. Depending on the state or value of certain flags 602, other ones of the flags 602 are not checked. For example, if the front suspension component 136 is in the open state, and the pedal short flag 602G is not set (i.e., not pedaling for a least a short period of time), the other flags 602 are not checked. Instead, the front suspension component 136 remains in the open state and the example process 1200 repeats. In other examples, the flags 602 can be checked in another order.

FIG. 13 is an example pedal state process 1300 implemented by the processor 208 when the front suspension component 136 is in the pedal state (the intermediate damping state). The example process 1300 is performed by the processor 208 at block 1104 in FIG. 11. As described in further detail below, the processor 208 checks the states or values of certain ones of the flags 602 and, depending on the states or values of the flags 602, the processor 208 determines whether to keep the front suspension component 136 in the open state or switch to one of the pedal state or the locked state.

When the front suspension component 136 is first switched into the pedal state, the processor 208 activates a hold time counter. The hold time counter counts down from a specific hold time threshold. The hold time threshold is an amount of time that the front suspension component 136 should stay in the pedal state. This prevents the front suspension component 136 from switching out of the pedal state too quickly. In the example process described below, the hold time threshold only applies when switching from the pedal state to the locked state. In other words, the front suspension component 136 stays in the pedal state for at least the hold time threshold before switching to the locked state. However, the front suspension component 136 may be switched immediately from the pedal state to the open sate. In other examples, the hold time threshold may also apply to switching from the pedal state to the locked state. In some examples, the hold time threshold is 1.5 seconds. In other examples, the hold time threshold may be a larger or smaller time value. The hold time counter may be represented by ticks or time increments.

At block 1302, the processor 208 checks whether the pedal now flag 602F and the pedal short flag 602G are clear. This is indicative that no pedaling is occurring or has occurred consistently for a certain amount of time (e.g., the set time from FIG. 8). If both the pedal now flag 602F and the pedal short flag 602G are clear, the processor 208, at block 1304, sets the suspension state to the open state. The processor 208 sets the suspension state to the open state by activating the motion controller 206 to move the valve 207 to a position that corresponds to the open state (the low damping state). As such, if the rider is not currently pedaling and has not pedaled consistently for a certain amount of time, the front suspension component 136 is switched back to the open state. This enables the front suspension component 136 to absorb any upcoming shocks or vibrations. Because the rider is not pedaling, switching to the open state does have a significant effect on the rider. Once the front suspension component 136 is in the open state, the processor 208 check or more of the flag(s) 602 using the open state process 1200 disclosed in connection with FIG. 12. At block 1304, the processor 208 also resets the hold time for the open state process, which prevents the front suspension component 136 from switching out of the open state too quickly.

If the pedal now flag 602F and the pedal short flag 602G are not clear (e.g., one or both of the flags 602F, 602G are set), the processor 208, at block 1306, checks whether the freefall flag 602I is set. If the freefall flag 602I is set (indicating the bicycle 100 is in a freefall), the processor 208, at block 1304, sets the suspension state to the open state and resets the hold time for the open state process. As such, if the bicycle 100 is in a freefall (even if pedaling is occurring or has recently occurred), the front suspension component 136 is switched to the open state to provide higher (e.g., maximum) shock absorption when the bicycle 100 lands.

If the freefall flag 602I is not set (i.e., the freefall flag 602I is clear, indicating the bicycle 100 is not in a freefall), the processor 208, at block 1308, checks whether the large vibration flag 602B is set. If the large vibration flag 602B is set (indicating a large vibration is being detected), the processor 208, at block 1304, sets the suspension state to the open state and resets the hold time for the open state process. As such, if the bicycle 100 is experiencing high vibration (even if pedaling is occurring), the front suspension component 136 is switched to the open state to provide higher (e.g., maximum) shock absorption.

If the large vibration flag 602B is not set (i.e., the large vibration flag 602B is clear, indicating a large vibration is not being detected), the processor 208, at block 1310, checks whether the medium vibration flag 602A is set. If the medium vibration flag 602A is set (indicating a medium vibration is being detected), the processor 208, at block 1312, resets the hold time. Control proceeds to block 1302 and the example process 1300 is repeated. As such, if medium vibration is detected while pedaling or within a certain amount of time of pedaling, the front suspension component 136 remains in the pedal state. In the pedal state, the front suspension component 136 provides some cushioning, but is more efficient for pedaling than the open state.

If the medium vibration flag 602A is not set (i.e., the medium vibration flag 602A is clear, indicating at least a medium vibration is not being detected), the processor 208, at block 1313, checks whether the medium vibration terrain flag 602D is set. If the medium vibration terrain flag 602D is set (indicating the bicycle 100 is riding over terrain causing a medium amount of vibration), the processor 208, at block 1312, resets the hold time. Control proceeds to block 1302 and the process 1300 is repeated. As such, if the bicycle 100 is riding over terrain causing a medium amount of vibration while the rider is pedaling or has pedaled for a certain amount of time, the front suspension component 136 remains in the pedal state.

If the medium vibration terrain flag 602D is not set (i.e., the medium vibration terrain flag 602D is clear, indicating low or no vibration over a period of time), the processor 208, at block 1314, checks whether the bump count flag 602C is set. If the bump count flag 602C is set (indicating that a threshold number of bumps have occurred within a period of time), the processor 208, at block 1312, resets the hold time. Control proceeds to block 1302 and the process 1300 is repeated. As such, if the rider is pedaling or has pedaled for a certain amount of time, and the bicycle 100 has experienced a threshold number of bumps over a period of time, the front suspension component 136 remains in the pedal state.

If the bump count flag 602C is not set (i.e., the bump count flag 602C is clear), the processor 208, at block 1316, checks whether the pitch state flag 602K indicates a steep ascent and/or the switchback flag 602J is set. As described above, in some examples, the pitch state flag 602K can be set to one of a plurality of values. One of the values (e.g., pitch state value seven) indicates a steep ascent. If the processor 208 determines the pitch state flag 602K is at such a value, and/or the switchback flag 602J is set, the processor 208, at block 1312, resets the hold time. Control proceeds to block 1302 and the process 1300 is repeated. Therefore, when pedaling up a steep hill or around a switchback, the front suspension component 136 remains in the pedal state, which is generally preferred over the open state because the pedal state enables more efficient pedaling in such conditions.

If the pitch state does not indicate a steep ascent and the switchback flag 602J is not set (i.e., the switchback flag 602J is clear, indicating a switchback has not occurred), the processor 208, at block 1318, checks whether the remaining hold time is greater than zero. If the remaining hold time is greater than zero, control proceeds to block 1320, and the processor 208 increments the hold time counter by reducing the hold time counter by one tick or time increment. The example process 1300 is then repeated starting at block 1302. As such, if the rider is pedaling the bicycle 100 and little or no vibrations are detected, but the hold time threshold has not yet been met, the front suspension component 136 remains in the pedal state. This ensures the front suspension component 136 remains in the pedal state for a sufficient amount of time to absorb vibrations before potentially switching to locked state.

If the remaining hold time is not greater than zero, the processor 208, at block 1322, checks whether the pedal now flag 602F and the pedal short flag 602G are set. If the pedal now flag 602F and the pedal short flag 602G are set (indicating that the rider is pedaling and has been pedaling for a certain amount of time), the processor 208, at block 1324, set the suspension state to the locked state. The processor 208 may set the suspension state to the locked state by activating the motion controller 206 to move the valve 207 to a position that corresponds to the locked state (the high damping state). Therefore, if the rider is pedaling the bicycle 100 and has been pedaling the bicycle 100 for a certain amount of time, and the bicycle 100 is riding over relatively level ground with little or no vibrations over a period of time, the front suspension component 136 switches to the locked state. This is generally preferred as the lock state enables the most efficient pedaling. Once the suspension component is in the locked state, the processor 208 checks one or more of the flag(s) 602 using a different process, which is disclosed in connection with FIG. 14. If both the pedal now flag 602F and the pedal short flag 602G are not set, control proceeds to block 1302, and the example process 1300 is repeated. As such, the front suspension component 136 remains in the pedal state.

As can be appreciated from FIG. 13, some of the example flags 602 may be considered more important to the process 1300 than other ones of the flags 602. Depending on the state or value of certain flags 602, other ones of the flags 602 are not checked. For example, if pedaling is not occurring and has not occurred for a short period of time, the front suspension component 136 is immediately switched to the open state without checking the remaining flags 602. In other examples, the flags 602 can be checked in another order.

FIG. 14 is an example locked state process 1400 implemented by the processor 208 when the front suspension component 136 is in the locked state (the high damping state). In the locked state, the front suspension component 136 provides the least amount of vibration absorption. However, the locked state is the best for pedaling. The example process 1400 is performed by the processor 208 at block 1106 in FIG. 11. As described in further detail below, the processor 208 checks the states or values of certain ones of the flags 602 and, depending on the states or values of the flags 602, the processor 208 determines whether to keep the front suspension component 136 in the locked state or switch to one of the open state or the pedal state.

At block 1402, the processor 208 checks whether the pedal short flag 602G is set. If the pedal short flag 602G is not set (i.e., the pedal short flag is clear, indicating pedaling has not occurred for a certain amount of time), the processor 208, at block 1404, checks whether the front suspension component 136 is in a road mode. The front suspension component 136 is set to a road mode when the pedal now flag 602F is set (described in further detail at block 1424 in the process 1400). When the front suspension component 136 is in the road mode, the processor 208 prevents the front suspension component 136 from switching out of the locked state if a short pedaling break occurs. For example, assume a rider has been pedaling the bicycle 100 for a longer period of time and the front suspension component 136 is in the locked state. If the rider stops pedaling for a brief time (e.g., the rider reaches a stop sign), the front suspension component 136 is not immediately switched out of the locked state. As such, the front suspension component 136 may remain in the locked state, which is preferable for continuing to pedal the bicycle 100.

If the front suspension component 136 is not in the road mode, the processor 208, at block 1406, sets the suspension state to the open state and resets the hold time for the open state process. The processor 208 sets the suspension state to the open state by activating the motion controller 206 to switch the damper 204 to the open state (the low damping state). As such, if the rider has not pedaled consistently for a certain amount of time, and the front suspension component 136 is not in the road mode, the processor 208 switches the front suspension component 136 to the open state. Once the front suspension component 136 is in the open state, the processor 208 checks one or more of the flag(s) 602 using the open state process 1200 disclosed in connection with FIG. 12.

If the pedal short flag 602G is set (checked at block 1402) or the front suspension component 136 is in the road mode (checked at block 1404), the processor 208, at block 1408, checks whether the freefall flag 602I is set. If the freefall flag 602I is set (indicating the bicycle 100 is in a freefall), the processor 208, at block 1406, sets the suspension state to the open state and resets the hold time for the open state process. As such, if the bicycle 100 is in a freefall (even if pedaling is occurring), the front suspension component 136 is switched to the open state to provide higher (e.g., maximum) shock absorption when the bicycle 100 lands.

If the freefall flag 602I is not set (i.e., the freefall flag 602I is clear, indicating the bicycle 100 is not in a freefall), the processor 208, at block 1410, checks whether the large vibration flag 602B is set. If the large vibration flag 602B is set (indicating a large vibration is being detected), the processor 208, at block 1406, sets the suspension state to the open state and resets the hold time for the open state process. As such, if the bicycle 100 is experiencing high vibration (even if pedaling is occurring), the front suspension component 136 is switched to the open state to provide higher (e.g., maximum) shock absorption.

If the large vibration flag 602B is not set (i.e., the large vibration flag 602B is clear, indicating a large vibration is not being detected), the processor 208, at block 1412, checks whether the medium vibration flag 602A is set. If the medium vibration flag 602A is set (indicating at least a medium amount of vibration is being detected), the processor 208, at block 1414, checks whether the pedal short flag 602G is set. If the pedal short flag 602G is not set (i.e., the pedal short flag 602G is clear, indicating that pedaling has not occurred for a certain amount of time), the processor 208, at block 1406, sets the suspension state to the open state and resets the hold time for the open state process. As such, if the bicycle 100 is experiencing medium vibration and no pedaling has occurred over a certain amount of time, the processor 208 switches the front suspension component 136 to the open state to provide higher (e.g., maximum) shock absorption.

If the pedal short flag 602G is set (determined at block 1414), the processor 208, at block 1416, sets the suspension state to the pedal state and resets the hold time for the pedal state process. The processor 208 sets the suspension state to the pedal state by activating the motion controller 206 to switch the damper 204 to the pedal state (the intermediate damping state). As such, if the rider is pedaling the bicycle 100, and the bicycle is experiencing medium vibration, the processor 208 switches the front suspension component 136 into the pedal state. This enables the front suspension component 136 to absorb some of the vibrations, but is also more efficient for pedaling than the open state. Once the front suspension component 136 is in the pedal state, the processor 208 checks one or more of the flag(s) 602 using the example pedal state process 1300 disclosed in connection with FIG. 13.

If the medium vibration flag 602A is not set (determined at block 1412), the processor 208, at block 1418, checks whether the bump count flag 602C is set. If the bump count flag 602C is set (indicating that a threshold number of bumps have occurred within a period of time), control proceeds to block 1414. Depending on whether the pedal short flag 602G is set or clear, the processor 208 switches the front suspension component 136 into the pedal state or the open state.

If the bump count flag 602C is not set (determined at block 1418), the processor 208, at block 1420, checks whether the pitch state flag 602K indicates a steep ascent and/or the switchback flag 602J is set. As described above, in some examples, the pitch state flag 602K can be set to one of a plurality of values. One of the values (e.g., pitch state value seven) indicates a steep ascent. If the processor 208 determines the pitch state flag 602K is at such a value, and/or the switchback flag 602J is set (indicating a switchback has occurred), the processor 208, at block 1416, sets the suspension state to the pedal state and resets the hold time for the pedal state process. Therefore, when pedaling up a steep hill or around a switchback, the front suspension component 136 is switched to the pedal state. The pedal state is generally preferred over the locked state in these conditions because the pedal state allows from some absorption of the bobbing motion from pedaling, which helps to keep the tires in contact with the ground.

If the pitch state does not indicate a steep ascent and the switchback flag 602J is not set (i.e., the switchback flag 602J is clear, indicating a switchback has not occurred), the processor 208, at block 1422, checks whether the pedal long flag 602H is set. If the pedal long flag 602H is not set (indicating pedaling has not occurred consistently over a longer period of time), control proceeds to block 1402 and the example process 14 is repeated. If the pedal long flag 602H is set (indicating pedaling has occurred consistently over a longer amount of time), the processor 208, at block 1424, sets the front suspension component 136 to the road mode. Then, the example process 1400 is repeated. As described above, when the front suspension component 136 is in the road mode, at least some of the pedal sensor data is ignored. As such, if the rider has been pedaling for a long time, but the rider stops pedaling for a short period of time, the front suspension component 136 is not immediately switched out of the locked state. Instead, the front suspension component 136 may remain in the locked state.

As can be appreciate from FIG. 14, some of the example flags 602 may be considered more important to the process 1400 than other ones of the flags 602. Depending on the state or value of certain flags 602, other ones of the flags 602 are not checked. For example, if the freefall flag 602I or the large vibration flag 602B are set, the other flags are not checked. Instead, the front suspension component 136 is immediately switched to the open state to provide higher (e.g., maximum) shock absorption.

Figure 15:
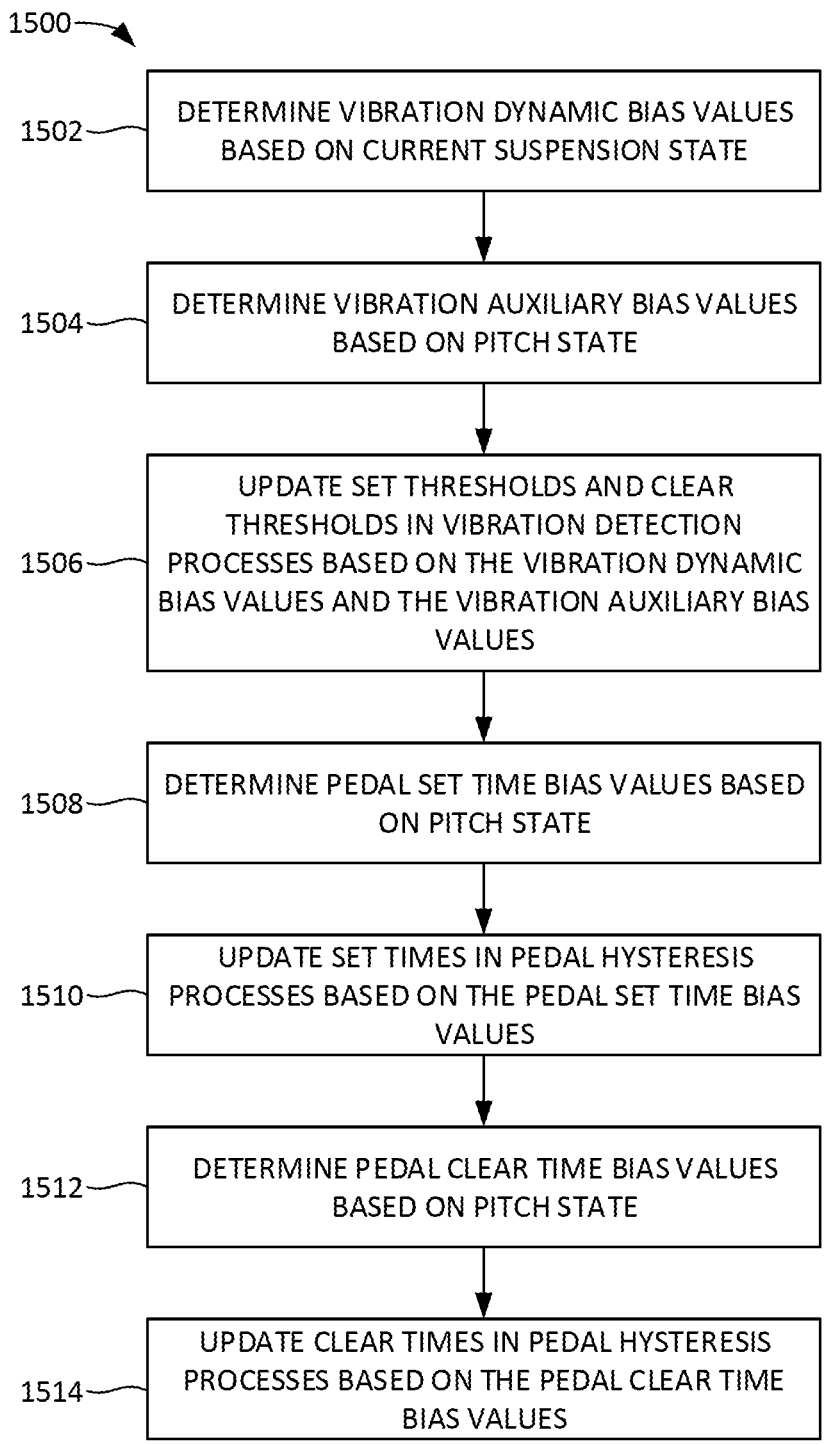
FIG. 15 is a flowchart of an example process implemented by the example processor of the example suspension component of FIG. 2 in the example process of FIG. 6 for adjusting in thresholds one or more of the example processes in FIG. 6.

FIG. 15 is a flowchart of an example process 1500 implemented by the processor 208 for updating the thresholds that are used in the vibration detection processes 700 (for blocks 608, 610, 614, 616 in FIG. 6) and the pedaling hysteresis processes 800 (for blocks 622, 624 of FIG. 6). The example process 1500 is performed by the processor 208 at block 636 in FIG. 6. Referring briefly to FIG. 6, block 636 receives the current suspension state from block 634, the pitch state from the pitch state flag 602K, and the trend pitch state from the trend pitch state flag 602L. The processor 208 uses these parameters to adjust the thresholds in the vibration detection processes 700 and/or the pedal hysteresis processes 800, as described below.

At block 1502, the processor 208 determines the vibration dynamic bias values based on the current suspension state. In some examples, the vibration dynamic bias values are stored in a table in the memory 210. For example, the table may be a 3×4 table that includes a vibration dynamic bias value for each of the vibration detection processes at blocks 608, 610, 614, 616 for the open state, the pedal state, and the locked state. Based on the current suspension state, the processor 208 identifies the corresponding vibration dynamic bias values to be used in the vibration detection processes at blocks 608, 610, 614, 616.

At block 1504, the processor 208 determines the vibration auxiliary bias values based on the pitch state (from the pitch state flag 602K). In some examples, the vibration auxiliary bias values are stored in a table in the memory 210. The table may include a vibration auxiliary bias value for each of the vibration detection processes at blocks 608, 610, 614, 616 based on the pitch state. In some examples, in addition to or as an alternative to the pitch state, the vibration auxiliary bias values can be based on the trend pitch state (from the trend pitch state flag 602L).

At block 1506, the processor 208 updates the set thresholds and the clear thresholds in the vibration detection processes based on the vibration dynamic bias values and the vibration auxiliary bias values. The vibration dynamic bias values and the vibration auxiliary bias values can be positive or negative values or percentages that increase or decrease the base threshold values to determine the set and clear thresholds. For example, the vibration medium detection process at block 608 utilizes a set threshold and a clear threshold. The set threshold is calculated using a base set threshold value, and then adding or subtracting the vibration dynamic bias value and the vibration auxiliary bias value. Thus, the vibration dynamic bias value and the vibration auxiliary bias value increase or decrease the base set threshold value. Similarly, the clear threshold is calculated using a base clear threshold value, the vibration dynamic bias value, and the vibration auxiliary bias value. This is similarly performed for at blocks 610, 614, 616 for the corresponding set and clear thresholds. Therefore, the set thresholds and the clear thresholds dynamically change each time the suspension state changes and/or the pitch state (i.e., the pitch angle) changes. As such, the current state of the front suspension component 136 and the pitch state of the bicycle 100 affects the results of the vibration detection processes occurring at blocks 608, 610, 614, 616. This helps account for the effects the suspension state and the pitch state have on the vibration detection processes and can help bias the suspension state to a more desired setting. For example, while climbing up a rocky terrain, bumps and vibrations are typically sensed at a slower pace because the bicycle 100 is moving at a slower speed. Therefore, the vibration auxiliary bias values may be negative values to help reduce the set thresholds, which enables suspension state to move to the open state more quickly.

At block 1508, the processor 208 determines the pedal set time bias values based on the pitch state (from the pitch state flag 602K). In some examples, the pedal set time bias values are stored in a table in the memory 210. For example, the table may be a 2×7 table that includes a pedal set time bias value for each of the pedal detection processes at blocks 622, 624 for each of the seven pitch states. Based on the pitch state, the processor 208 identifies the pedal set time bias values to be used in the pedal detection processes at blocks 622, 624. The pedal set time bias values can be positive or negative values or percentages.

At block 1510, the processor 208 updates the set times in the pedal hysteresis processes at blocks 622, 624 based on the pedal set time bias values. For example, the pedal hysteresis process at block 622 for the pedal short flag 602G utilizes a set time. The set time is calculated using a base set time and then adding or subtracting the pedal set time bias value, thereby increasing or decreasing the set time. This calculation is similarly performed for the pedal detection process at block 624.

At block 1512, the processor 208 determines the pedal clear time bias values based on the pitch state (from the pitch state flag 602K). In some examples, the pedal clear time bias values are stored in a table in the memory 210. For example, the table may be a 2×7 table that includes a pedal clear time bias value for each of the pedal detection processes at blocks 622, 624 for each of the seven pitch states. Based on the pitch state, the processor 208 identifies the pedal clear time bias values to be used in the pedal detection processes at blocks 622, 624. The pedal clear time bias values can be positive or negative values or percentages.

At block 1514, the processor 208 updates the clear times in the pedal detection processes at blocks 622, 624 based on the pedal clear time bias values. For example, the pedal detection process at block 622 for the pedal short flag 602G utilizes a clear time. The clear time is calculated using a base clear time and then adding or subtracting the pedal clear time bias value, thereby increasing or decreasing the clear time. This calculation is similarly performed for the pedal detection process at block 624. Therefore, the set times and the clear times dynamically change each time the pedal state (i.e., the pitch angle) changes. As such, the pitch of the bicycle 100 affects the results of the pedal short and pedal long processes occurring at blocks 622, 624. This helps bias the front suspension component 136 to certain suspension states based on the pitch of the bicycle 100.

In some examples, the user or rider can provide an input (e.g., via the user interface 218 (FIG. 2)) that affects the decision of the front suspension component 136 to stay in a suspension state or switch to another suspension state. For example, if a rider prefers a stiffer suspension, the rider may desire the front suspension component 136 to be set in the locked or pedal states more often. Conversely, if a rider prefers a softer rider, the rider may desire the front suspension component 136 to be set to the open or pedal states more often. In some examples, the rider can provide this input by selecting a bias setting from a plurality of bias settings. Each of the bias settings may affect the decision process to bias the front suspension component 136 to one or more of the suspension states. In some examples, the rider can select a bias setting by pushing a button on the front suspension component 136, for example. In one example, the front suspension component 136 has five bias settings referred to as −2, −1, 0, +1, and +2. The −2 bias setting may correspond to a setting that favors the open state (and, thus, a softer ride), the 0 bias setting may be a neutral setting, and the +2 bias setting may be a setting that favors the locked state (and, thus, a stiffer ride). The rider may be able to adjust the bias setting up or down based on the rider's preferred riding style. In other examples, more or fewer bias settings may be provided.

In some examples, each of the bias settings represents a collection of thresholds. As disclosed above, the vibration detection processes at blocks 608, 610, 614, 616 utilize base threshold values for calculating the set and clear thresholds. Similarly, the pedal hysteresis processes at block 622, 624 utilize base set and clear times for calculating the set and clear times. In some examples, each one of the bias settings includes a collection of base threshold values for the vibration detection processes and base set and clear times for the pedal hysteresis processes. The base threshold values and base set and clear times may be the same or different for different ones of the bias settings. Based on the bias setting selected by the user, the corresponding collection of thresholds is applied to the vibration detection processes and the pedal hysteresis processes, which affects the decision process for setting the front suspension component 136 in a certain state.

In some examples, in addition to or as alternative to changing the thresholds, the different bias settings can also change the decision process or logic, such as the processes 1200, 1300, 1400 disclosed in connection with FIGS. 12, 13, and 14. For example, certain bias settings may remove certain flags from a process, add flags to a process, and/or rearrange the order the flags are checked.

While the example flowcharts in FIGS. 6-15 are described in connection with the front suspension component 136, it is understood that the same processes disclosed in FIGS. 6-15 may be similarly implemented by a processor in the rear suspension component 138 for affecting the state of the rear suspension component 138. Therefore, in some examples, the rear suspension component 138 operates independently to analyze the sensor data and select a suspension state for the rear suspension component 138 based on the sensor data. In some examples, this results in the rear suspension component 138 being set to the same suspension state as the front suspension component 136. In other examples, the rear suspension component 138 can implement different decision processes that result in different states for the rear suspension component 138 than the front suspension component 136.

In some examples, the front suspension component 136 controls the state of the rear suspension component 138. For example, the front suspension component 136 may determine the desired suspension state for the front suspension component 136 and for the rear suspension component 138 and can instruct the rear suspension component 138 to change to the appropriate state. In some examples, the rear suspension component 138 is always set to be in the same state as the front suspension component 136. Therefore, if the front suspension component 136 is switched to a specific suspension state, the front suspension component 136 transmits a command to the rear suspension component 138 to switch to the same state. In other examples, the front suspension component 136 may implement processes that can result in different states for the front and rear suspension components 136, 138. For example, the front suspension component 136 may determine to keep the front suspension component 136 in the open state but change the rear suspension component to the pedal state. In such an example, the front suspension component 136 transmits a command to the rear suspension component 138 to switch to the pedal state. Conversely, the rear suspension component 138 can control the front suspension component 136. In still other examples, the processes disclosed herein can be executed in another device separate from the front and rear suspension components 136, 138 and may transmit commands to the front and rear suspension components 136, 138 accordingly.

As disclosed above in connection with FIG. 6, the processor 208 can use certain parameters, such as vibration, pedaling, bump count, freefall, switchback, and pitch, to determine whether to adjust the suspension state. In addition to or as an alternative to these parameters, the example process 600 can utilize one or more other parameters for deciding whether to adjust the suspension state. Below are other example parameters that can be used in combination with other parameters to set certain ones of the flags 602 from FIG. 6 and/or used to set their own flags.

(1) In some examples, speed and/or duration can be used to determine whether to adjust the suspension state. Speed can be measured via wheel rotation speed (e.g., from a wheel speed sensor), drivetrain speed and gear ratio, a global position system (GPS) sensor, and/or other means. In some examples, higher speeds may adjust the damper state to a preset setting of the open state or some level less than the open state for improved suspension performance. Duration is a time measurement of a speed within a range that may also adjust the damper state.

(2) In some examples, the gear ratio of the bicycle 100 can be used to determine whether to adjust the damper state. The gear ratio can be measured by a position of the chain 122 (FIG. 1), known gear teeth count per position, and/or position of a derailleur itself (e.g., the rear gear change device 134 (FIG. 1)). For example, the rear gear change device 134 may be electronic and can be used to automatically change gears. The current gear state can be provided by the rear gear change device 134. Individual gear settings, and their time in those settings, may adjust the damper state for improved suspension performance.

(3) In some examples, differential wheel speed can be used to determine whether to adjust the damper state. Changes in pedaling and braking traction can produce different wheel rotational speeds, indicating tire slippage or skidding. In some examples, the front and rear wheels 104, 106 may have independent rotational speed sensors to determine differential wheel speeds. Differential or identical wheel speeds may adjust the damper state to improve suspension performance under these conditions.

(4) In some examples, seat post height can be used to determine whether to adjust the damper state. Often a rider sets the seat post height based on upcoming trail conditions, and this height may be measured by position scaled sensor. The seat post height may adjust the damper state to improve the suspension performance. For example, a low seat height may indicate the desire for an open or near open damper state.

(5) In some examples, brake force and duration can be used to determine whether to adjust the damper state. Brake force may be determined from brake component strain measurement, brake component torque measurement, hydraulic pressure measurement in a brake caliper, accelerometers, etc. The brake force may be measured on the bicycle 100 in each individual wheel. The bicycle 100 may have more than one brake, with different force measurements acting on each wheel. Braking forces may adjust the front suspension component 136 to a locked state or less than locked state, while adjusting the rear suspension component 138 to an open state or less than open state for optimal suspension performance.

(6) In some examples, rider drive force can be used to determine whether to adjust the damper state. Rider drive force is the pedal force input by the rider. Rider drive force may be measured by drivetrain component strain or force sensor, a power meter, and accelerometer, or a center of gravity shift. Rider drive forces may adjust the damper state to a medium state (e.g., the pedal state), or more or less, to provide optimal suspension performance and pedaling efficiency.

(7) In some examples, suspension design kinematics, such as changing leverage ratio, can be used to determine whether to adjust the damper state. A suspension chassis design may have a leverage rate, such as a ratio of wheel displacement to corresponding shock displacement, that changes or stays the same in its suspension travel range. This rate affects the damper piston displacement, which may have adjustment settings desired for optimal suspension performance. A suspension component position sensor, along with suspension ratio information, can provide damper piston movement information. This information may adjust the damper state. For example, a wheel displacement to shock displacement ratio of 2:1 may adjust the damper state to a more open state than a ratio of 3:1 for optimal suspension performance.

(8) In some examples, suspension pressure travel can be used to determine whether to adjust the damper state. Different riders may use different at-rest air pressure settings in a suspension component. Further, different trail conditions may have different ranges of air pressures in use. Pressure sensors may be used in a suspension component, and measurements from these sensors can be used to adjust the damper state for optimal suspension performance.

(9) In some examples, tire pressure can be used to determine whether to adjust the damper state. The bicycle 100 may include tire pressure sensors on the valve stems. Different users may use different tire pressures, affecting suspension performance. Tire pressure sensors measurements can be used to adjust the damper state for optimal performance.

(10) In some examples, damper fluid temperatures can be used to determine whether to adjust the damper state. Damper fluid temperatures may change due to operating conditions and ambient air temperatures, thereby affecting suspension performance. Fluid temperature sensors, such as thermocouples, can provide temperature values that can be used to adjust the damper state for optimal performance.

(11) In some examples, movement of the damper pistons can be used to determine whether to adjust the damper state. In some examples, a front damper piston may move uniquely independent to a rear damper piston on various trail conditions. Dampers may have position, velocity, or acceleration sensors to measure piston movement. Different combinations of front damper piston movement to rear damper piston movement from these sensors can be used to adjust the damper state for optimal suspension performance.

(12) In some examples, front and rear suspension height can be used to determine whether to adjust the damper state. Independent front suspension height and rear suspension height be by set by the user. In addition, average suspension heights may change on different trail conditions or inclinations. These suspension heights may be measured with suspension component position sensors, which can be used to adjust the damper state for optimal suspension performance.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A suspension component for a bicycle, the suspension component comprising:
   a damper operable in a low damping state, a high damping state, and an intermediate damping state between the low damping state and the high damping state;
   a motion controller operable to change the damper between the low damping state, the intermediate damping state, and the high damping state; and
   a processor to, based on sensor data, activate the motion controller to change the damper between the intermediate damping state and one of the low damping state or the high damping state,
   wherein the processor is to, based on the sensor data, select values for one or more flags representative of parameters of a state of the bicycle and/or a riding environment of the bicycle, wherein the processor is to select one of the low damping state, the intermediate damping state, or the high damping state based on the values of the one or more flags,
   wherein when the damper is in the low damping state, the processor is to check one or more of the flags using a first process;
   when the damper is in the intermediate damping state, the processor is to check one or more of the flags using a second process that is different than the first process; and
   when the damper is in the high damping state, the processor is to check one or more of the flags using a third process that is different than the first process and the second process.

2. The suspension component of claim 1, wherein the sensor data is from a sensor that detects pedaling of the bicycle.

3. The suspension component of claim 2, further including a wireless transceiver to receive the sensor data from the sensor.

4. The suspension component of claim 1, further including a sensor to detect vibration input to the suspension component, the sensor to output the sensor data.

5. The suspension component of claim 1, wherein processor is to select values for the flags based on comparisons of the sensor data to thresholds.

6. The suspension component of claim 5, wherein the processor is to change the thresholds based on a current state of the damper.

7. A suspension component for a bicycle, the suspension component comprising:
a damper;
a motion controller operable to change the damper between a first damping state and a second damping state; and
a processor to activate the motion controller to change the damper between the first damping state and the second damping state based on a first output value produced from sensor data from a first time period and a second output value produced from sensor data from a second time period, the second time period being longer than the first time period.

8. The suspension component of claim 7, wherein the second time period includes the first time period and a period of time occurring prior to the first time period.

9. The suspension component of claim 7, wherein the processor is to:
detect an amount of current vibration based on the sensor data from the first time period; and
detect an amount of vibration from a terrain based on the sensor data from the second time period.

10. The suspension component of claim 7, wherein the processor is to:
apply a standard deviation filter to the sensor data from the first time period to produce the first output value; and
apply an exponential moving average filter to the sensor data from the second time period to produce the second output value.

11. The suspension component of claim 10, wherein the processor is to:
compare the first output value to a first threshold to set a first flag; and
compare the second output value to a second threshold to set a second flag.

12. The suspension component of the claim 11, wherein the processor is to select the first damping state or the second damping state based on the first and second flags.

13. A suspension component for a bicycle, the suspension component comprising:
a damper;
a motion controller to change the damper between a first damping state and a second damping state;
a wireless transceiver to receive sensor data from a sensor; and
a processor to activate the motion controller to change the damper between the first damping state and the second damping state based on the sensor data, wherein the suspension component is a first suspension component, the sensor being of an accelerometer of a second suspension component, the sensor data being acceleration data, and the second suspension component being configured to wirelessly communicate a signal representative of the acceleration data to the first suspension component.

14. The suspension component of claim 13, wherein the sensor is a pedal detection sensor and the sensor data is pedaling data.

15. The suspension component of claim 14, wherein the processor is to determine whether a rider is currently pedaling the bicycle and activate the motion controller based on whether the rider is currently pedaling the bicycle.

16. The suspension component of claim 13, wherein the processor is to determine a pitch state of the bicycle based on the acceleration data and activate the motion controller based on the pitch state.

* * * * *